INVENTORS
STEPHEN T. MORELAND
ROBERT E. TYNER
BY Mason, Porter, Diller & Stewart
ATTORNEYS

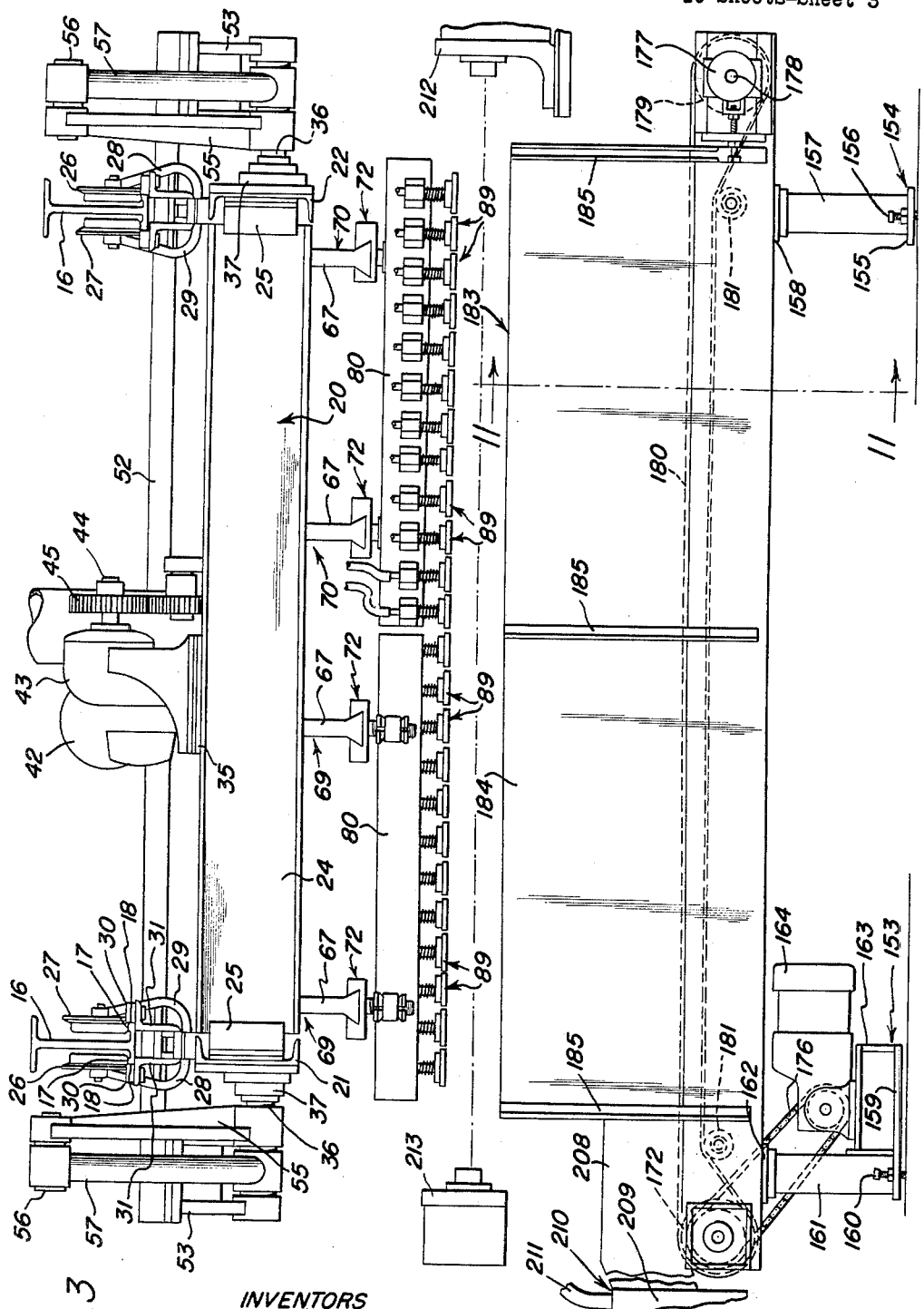

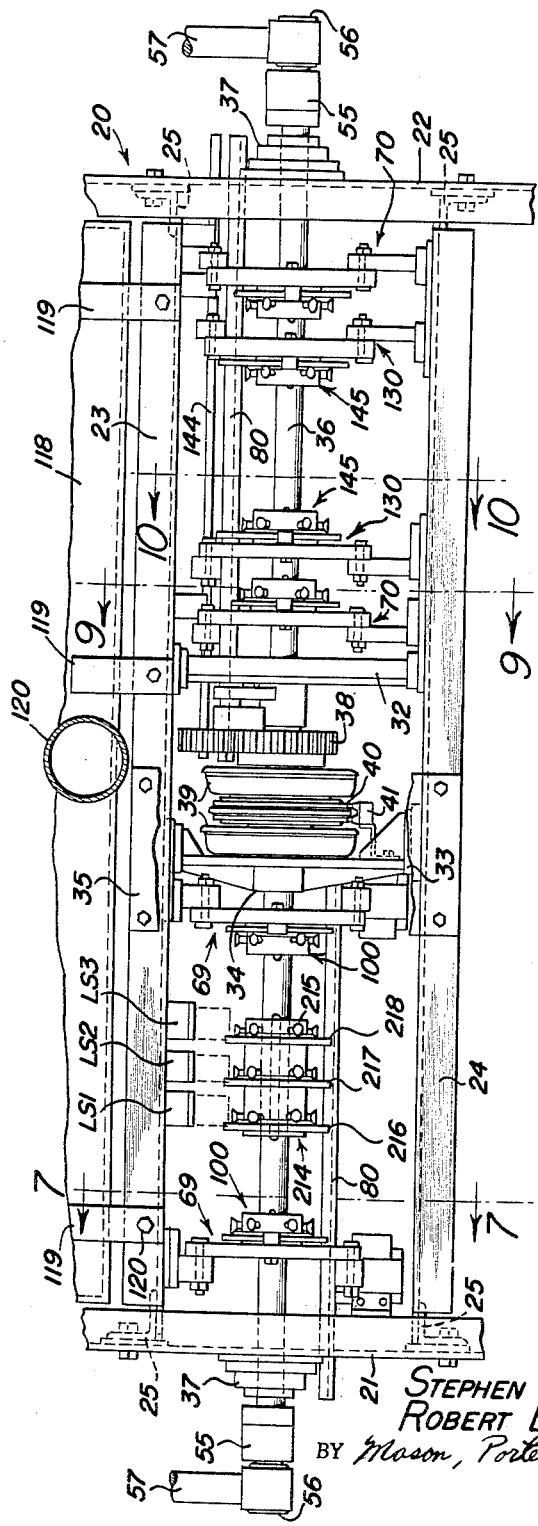

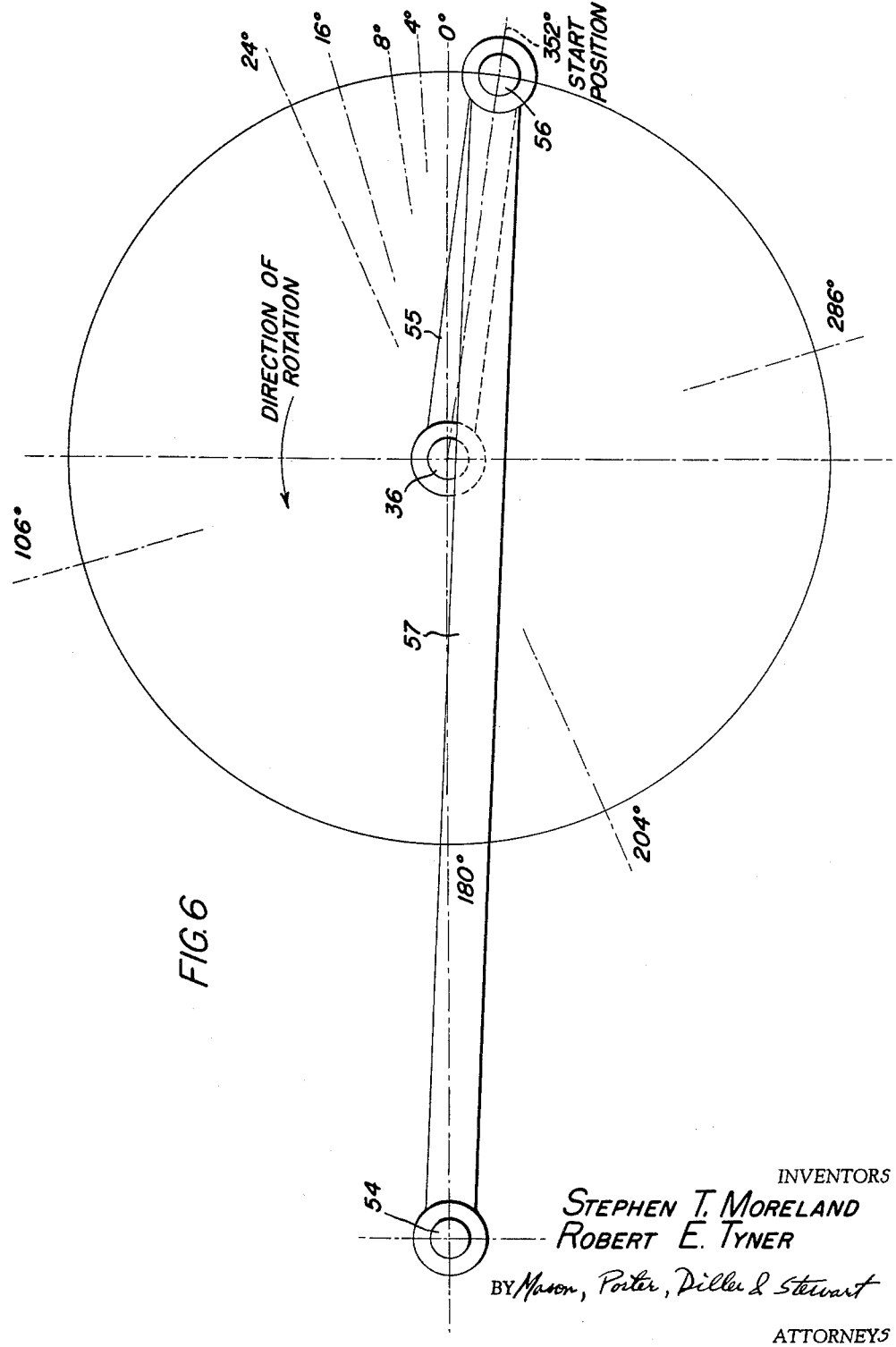

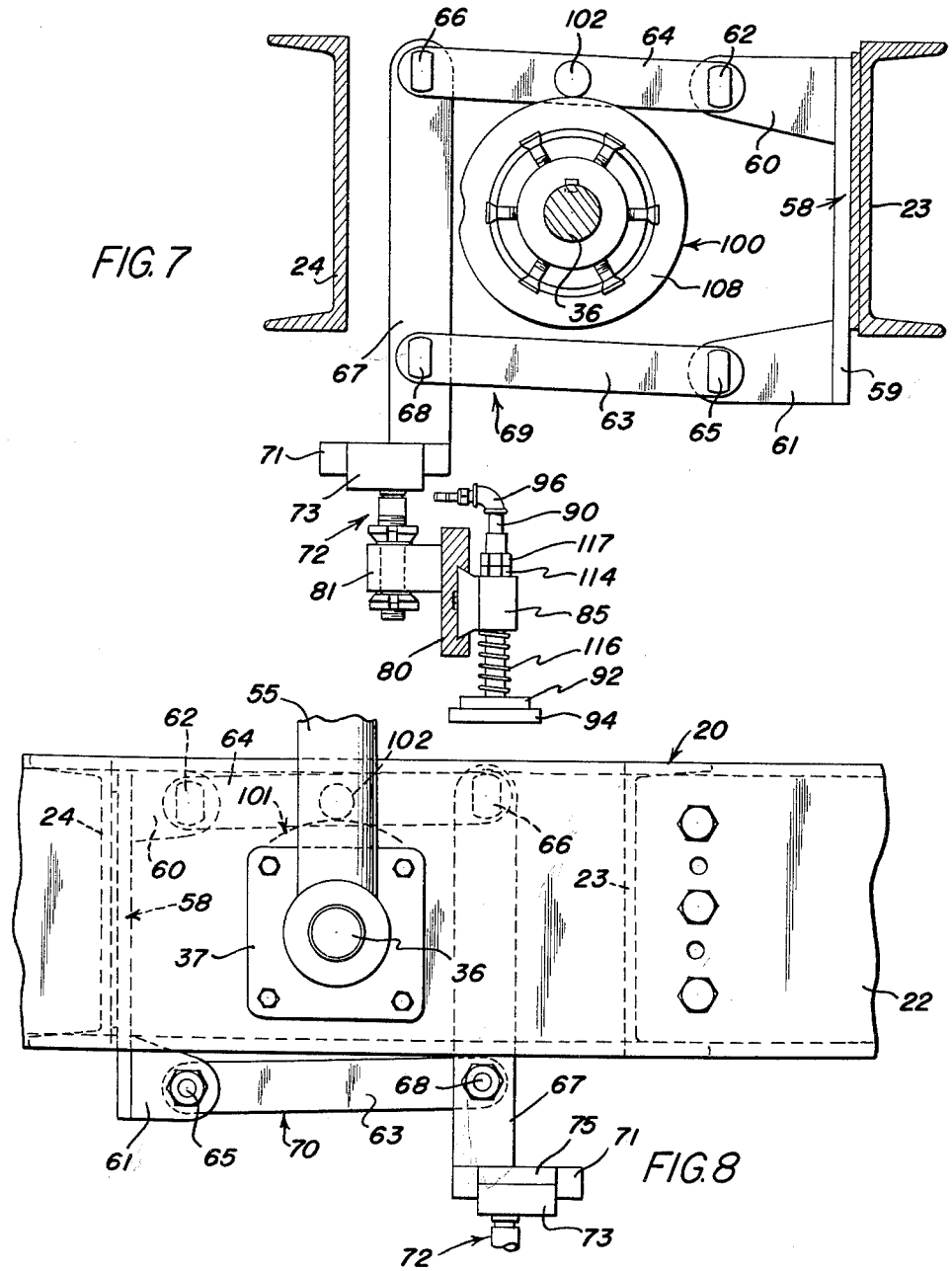

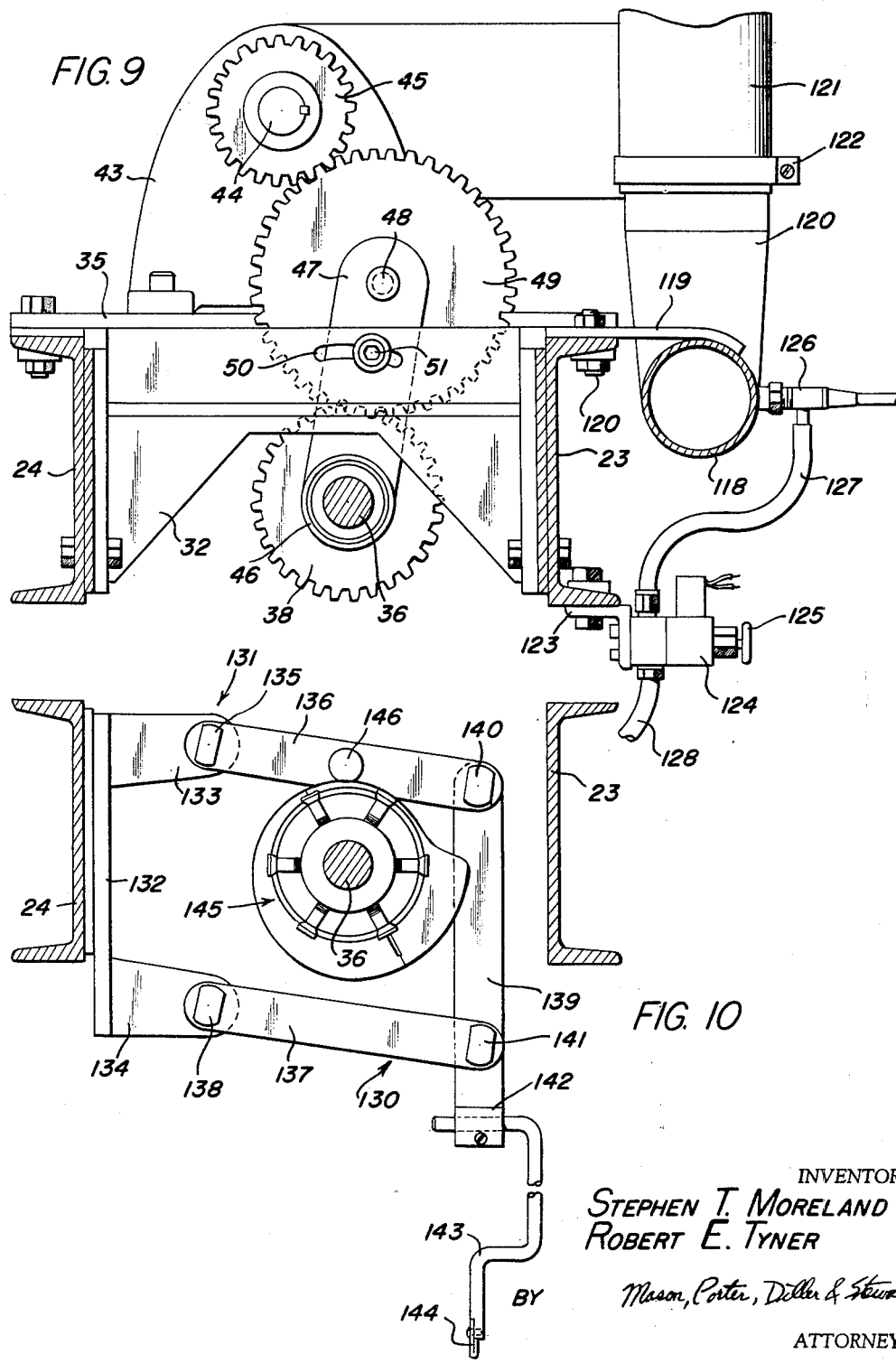

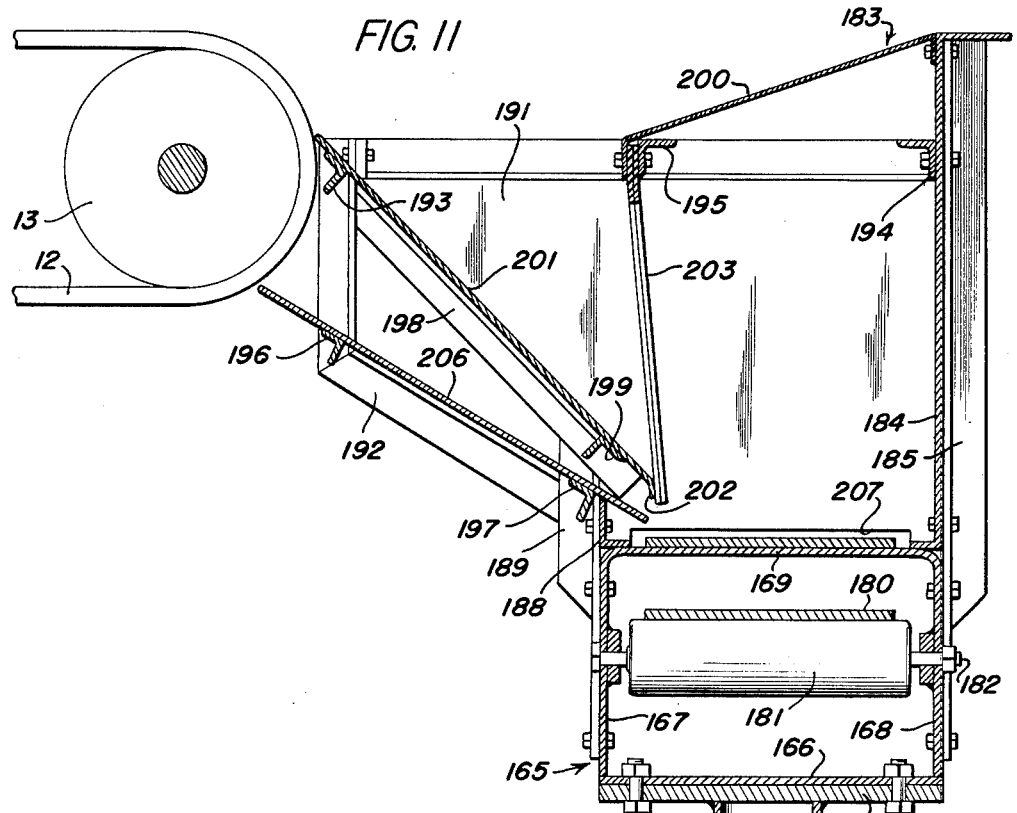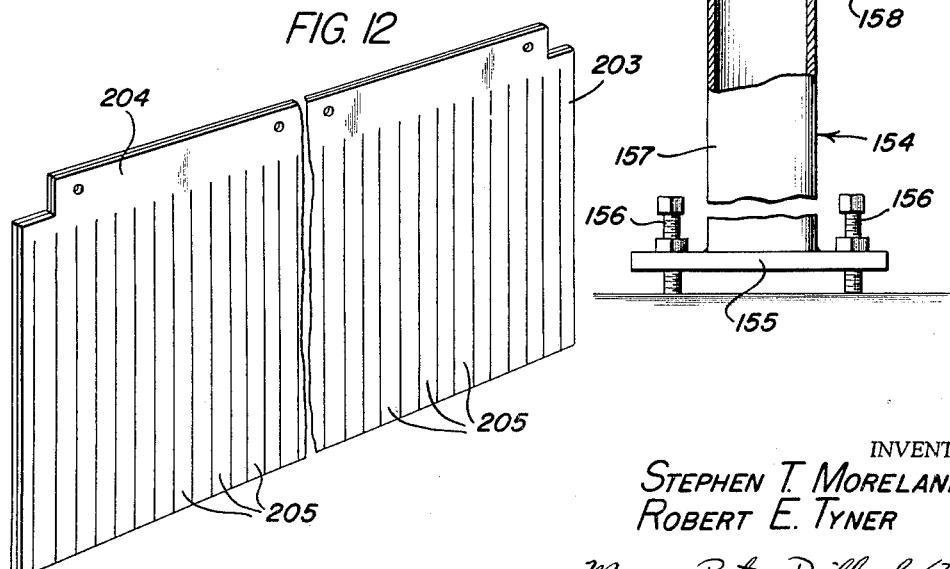

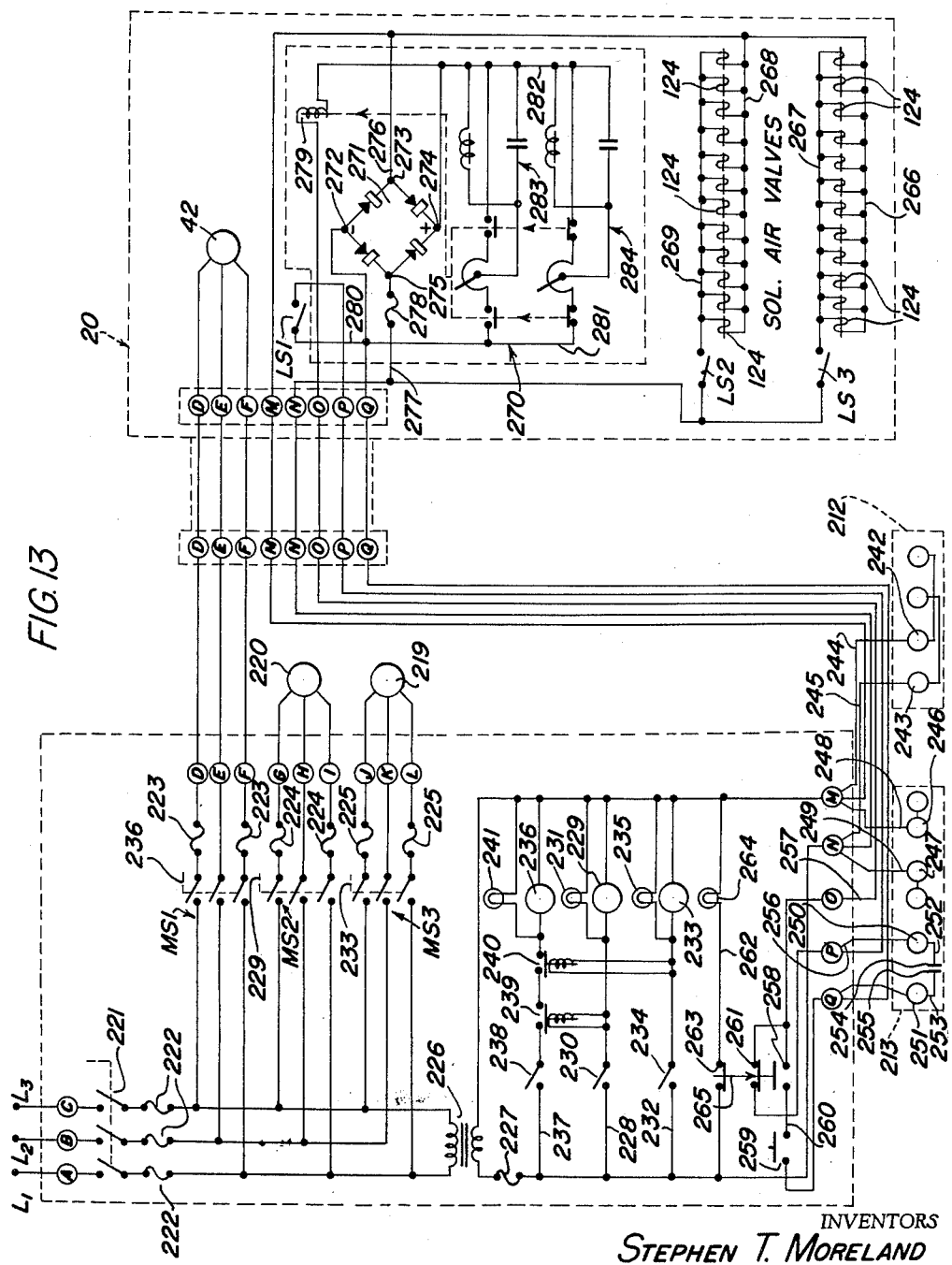

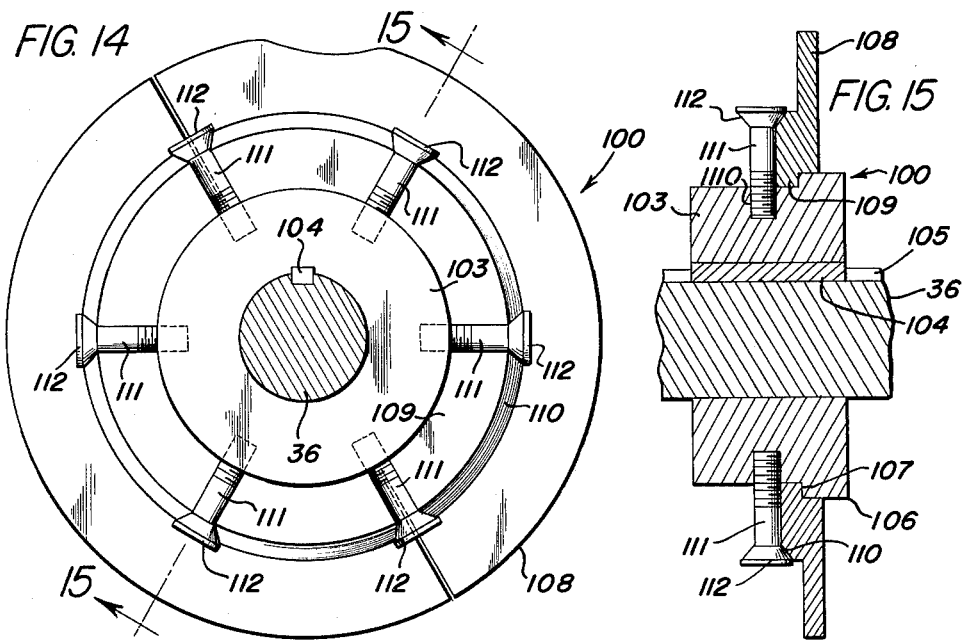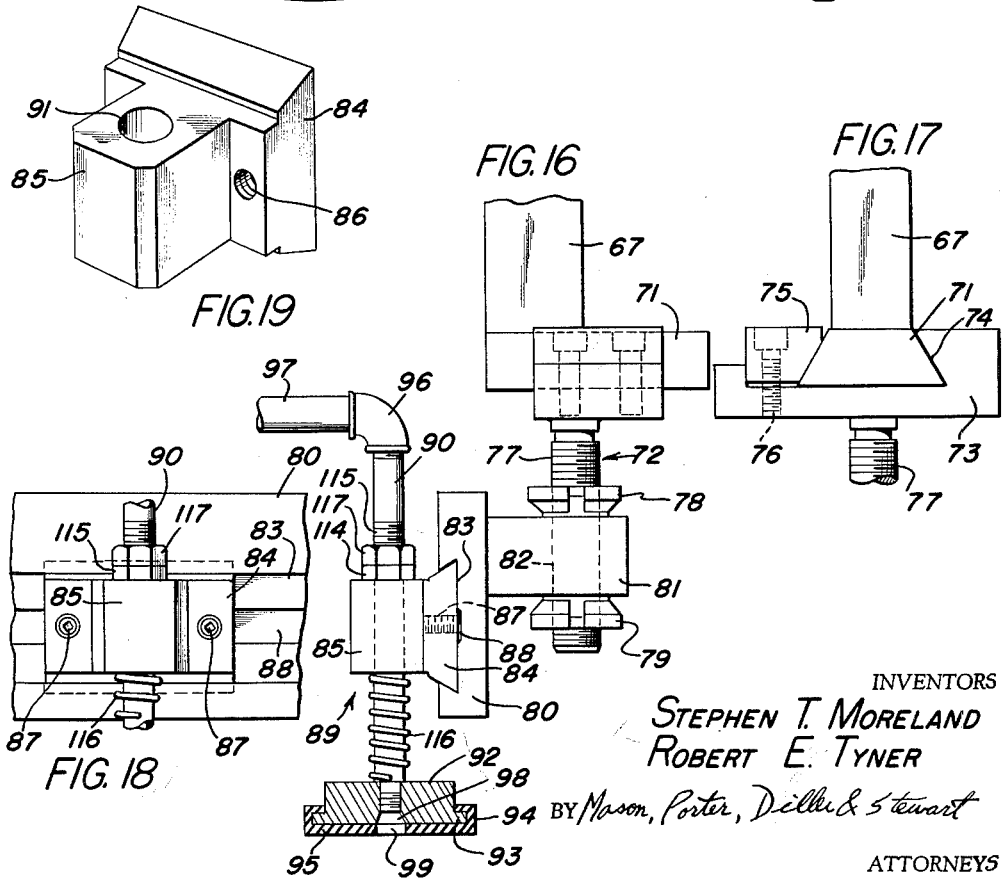

United States Patent Office 3,072,252
Patented Jan. 8, 1963

3,072,252
GLASS JAR UNLOADER
Stephen T. Moreland, Wethersfield, Conn., and Robert E. Tyner, Toledo, Ohio, assignors to Continental Can Company, Inc., New York, N.Y., a corporation of New York
Filed Mar. 17, 1959, Ser. No. 799,986
31 Claims. (Cl. 209—80)

The invention relates generally to the art of transferring articles from one conveyor to another and primarily seeks to provide a novel mechanism for picking up articles, such as glass jars, from one conveyor, bodily transferring such articles to a position overlying a second conveyor, and setting the articles on the second conveyor.

In the manufacturing of glass jars and similar glass articles it is necessary that the glass articles be annealed by being passed through a lehr, the lehr including an annealing oven having a lehr conveyor passing therethrough. The lehr conveyor projects beyond both ends of the annealing oven with that end of the lehr conveyor receiving hot newly manufactured glass articles being considered the hot end of the lehr conveyor and the discharge end of the lehr conveyor being considered the cold end. Hot jars or glass articles, freshly manufactured, are loaded onto the hot end of the lehr conveyor by automatic means which place the jars very accurately in rows and columns onto the lehr conveyor and the glass jars maintain these positions during the traverse of the annealing oven. As the glass jars are conveyed at a constant speed through the annealing oven, the temperature of the jars is brought up slowly to the temperature at which they are formed, and then they are very slowly cooled until at the cold end of the lehr conveyor the glass jars are at about room temperature. This operation is necessary in order to eliminate stresses in the glass brought about by too rapid and uneven cooling during and right after the manufacturing process. If the glass of the jars is not annealed, it will shatter or explode after the jars have set awhile.

Heretofore, upon reaching the cold end of the lehr conveyor, the glass jars were deposited on a dead plate which extended between the cold end of the lehr conveyor and a single line conveyor extending transversely of the lehr conveyor. The glass jars remained in their initial positions on the dead plate until a new row of jars was moved onto the dead plate at which time glass jars of the second row of glass jars engaged the glass jars of the first row and pushed the first row of glass jars forward. The next succeeding row of glass jars then had to push the two preceding rows of glass jars along the dead plate and when the frictional engagement between the third row of glass jars and the lehr conveyor belt was insufficient, the pushing pressure of a fourth row of glass jars was required to move the first row of glass jars off the dead plate and onto the single line conveyor. This bumping together of the glass jars caused many of them to develop flaws and later led to their rejection during inspection. Further, in being pushed onto the single line conveyor belt, the glass jars were often disoriented from their original equally spaced positions due to the unevenness of the pushing operation, causing some of the glass jars to land on the single line conveyor ahead of others of the glass jars of the same row. This uneven spacing of the glass jars on the single line conveyor made it more difficult to remove the glass jars from the single line conveyor belt for inspection purposes.

In view of the foregoing, it is a primary object of the invention to provide a novel transfer mechanism which will engage the individual jars of a row of glass jars as they approach the discharge end or cold end of a lehr conveyor and lift such glass jars bodily off of the lehr conveyor, transfer the glass jars to a position overlying a single line conveyor extending transversely of the lehr conveyor at the discharge end thereof and then set the glass jars of each row onto the single line conveyor while maintaining the spacing between adjacent jars.

Many of the defects of glass jars and similar glass articles occur in the formation of the open mouths of the glass jars. Common defects in the construction of the mouths of glass jars are the saddle defect and the dropped finish defect. A saddle defect is one where there is a short depression in the mouth upper surface whereas the dropped finish defect is one where a large portion of the mouth upper surface is sunk or bowed downwardly. Both of these defects will prevent a proper seal between the mouth of the glass jar and a closure for the glass jar.

It is therefore another object of the invention to provide a novel transfer mechanism for transferring glass jars and similar open mouth articles from one conveyor to another with the transfer mechanism being so constructed whereby the glass jars are individually lifted by pick-up heads which form seals with the mouths of the glass and the lifting action is effected through a suction between the individual glass jar and a respective one of the pick-up heads. In this manner in the event the mouth formation of the individual glass jar should be defective, a seal between the glass jar and the respective pick-up head will not be formed and the defective jar will remain on the one conveyor with the transfer mechanism thus also functioning as an inspection mechanism during the transfer of the glass jar.

Another object of the invention is to provide a transfer mechanism for transferring articles from a first conveyor on which the articles to be transferred are arranged in rows and columns to a pair of single line conveyors disposed transversely of the first conveyor, the transfer mechanism including means for simultaneously engaging and picking up a portion of the articles in one row and the remaining articles in a preceding row and depositing the articles from the one row onto one of the single line conveyors and the articles from the preceding row onto the other of the single line conveyors.

Still another object of the invention is to provide an improved transfer mechanism for engaging and picking up articles disposed on one conveyor and transferring such articles to a second conveyor, the transfer mechanism including a trackway extending above and between the two conveyors, a carriage mounted on said trackway for reciprocatory movement between positions overlying the two conveyors, article pick-up means mounted on the carriage for engaging and lifting articles to be transferred and retaining the articles in elevated positions during the movement of the carriage from a position overlying the one conveyor to a position overlying the other conveyor, said carriage having a drive unit that effects in timed sequence the reciprocation of the carriage and the operation of the article pick-up means.

A further object of the invention is to provide a novel cam assembly, the cam assembly including a hub and a cam, the hub having means for attachment to a shaft and an annular cam receiving recess, the cam being formed in sections with inner portions of the cam sections being seated in the recess of the cam hub, each of the cam sections having a shoulder disposed inwardly of the cam surface thereof, and the hub having a plurality of releasable fasteners frictionally engaging the shoulders of the cam sections to retain the cam sections in adjusted positions on the hub.

Another object of the invention is to provide a novel conveyor system for glass jars and the like wherein there exists a supply conveyor on which there are positioned glass jars in rows and columns and a single line receiving conveyor extending transversely of said supply conveyor at the discharge end of the supply conveyor and spaced therefrom, a cullet conveyor at the supply conveyor discharge end intermediate the supply conveyor and the receiving conveyor, and a combined transfer and inspection unit for engaging and transferring glass jars carried by the supply conveyor to the receiving conveyor with the combined transfer and inspection unit refusing glass jars having defectively formed mouths and the rejected glass jars passing on to the cullet conveyor.

Still another object of the invention is to provide a cullet conveyor unit particularly adapted for handling culls of glass articles, the cullet conveyor unit including a cullet conveyor mounted within a housing and the air within the housing being continually withdrawn so that the air pressure within the housing is less than atmospheric with the result that the undesired escape of glass particles is prevented.

A still further object of the invention is to provide a transfer unit for transferring open mouth articles from one conveyor to another, the transfer unit including a trackway extending between the two conveyors, a carriage mounted on the trackway for movement back and forth between positions overlying the two conveyors, suction type pick-up means depending from the carriage for forming a lifting seal with the mouths of the articles to be transferred, a drive assembly mounted on the carriage for reciprocating the carriage and operating the pick-up means, and controls for the drive means effecting a cycle operation, the controls including a photo-electric cell unit responsive to movement of articles along the one conveyor, whereby in the operation of the unit as a row of articles reach a predetermined position on the one conveyor the transfer unit is activated to pick up articles of the row of articles, transfer the articles to the other conveyor and return to its starting position awaiting the movement of a next row of articles along the one conveyor to the predetermined position.

With the above and other objects in view that will hereinafter appear, the nature of the invention will be more clearly understood by references to the following detailed description, the appended claims and the several views illustrated in the accompanying drawings.

In the drawing:

FIGURE 3 is an end view of the mechanism of FIGURE 2 with the single line conveyors being omitted for purposes of clarity.

FIGURE 4 is an enlarged fragmentary top view of the jar transfer and inspection mechanism and shows the specific details of the drive mechanism thereof.

FIGURE 5 is an enlarged schematic perspective view of the drive mechanism.

FIGURE 6 is a schematic view on an enlarged scale of the motion transmitting linkage of the jar transfer and inspection mechanism.

FIGURE 7 is an enlarged fragmentary longitudinal vertical sectional view taken on the line 7—7 of FIGURE 4 and shows the details of the means provided for mounting and shifting the support for one set of pick-up heads.

FIGURE 8 is an enlarged fragmentary side view of the upper part of the jar transfer and inspection mechanism, as viewed from the right in FIGURE 4, and shows the details of means provided for mounting and shifting the support for the other set of pick-up heads.

FIGURE 9 is an enlarged fragmentary vertical sectional view taken on the line 9—9 of FIGURE 4 and shows the details of the drive for the main drive shaft of the jar transfer and inspection mechanism and the vacuum producing means for the pick-up heads.

FIGURE 10 is an enlarged fragmentary vertical sectional view taken on the line 10—10 of FIGURE 4 and shows the manner in which the pusher bar is mounted and actuated.

FIGURE 11 is an enlarged fragmentary vertical sectional view taken on the line 11—11 of FIGURE 3 and shows the details of the cullet conveyor.

FIGURE 12 is an enlarged perspective view of a baffle of the cullet conveyor with an intermediate part of the baffle being omitted.

FIGURE 13 is a wiring diagram of the electrical controls for the invention.

FIGURE 14 is an enlarged fragmentary vertical sectional view through the main drive shaft and shows the details of one of the drive cams carried thereby.

FIGURE 15 is a sectional view taken on the line 15—15 of FIGURE 14 and shows the specific details of construction of the drive cam.

FIGURE 16 is an enlarged fragmentary side elevational view showing the mounting arrangement for one of the pick-up heads, the pick-up head being shown in section.

FIGURE 17 is a fragmentary elevational view as viewed from the right in FIGURE 16 and shows the details of the connection between a lift arm and a respective dependent hanger.

FIGURE 18 is an enlarged fragmentary elevational view of the connection between an individual pick-up head mounting block and a support bar therefor.

FIGURE 19 is an enlarged perspective view of a pick-up head mounting block.

Figure 1:
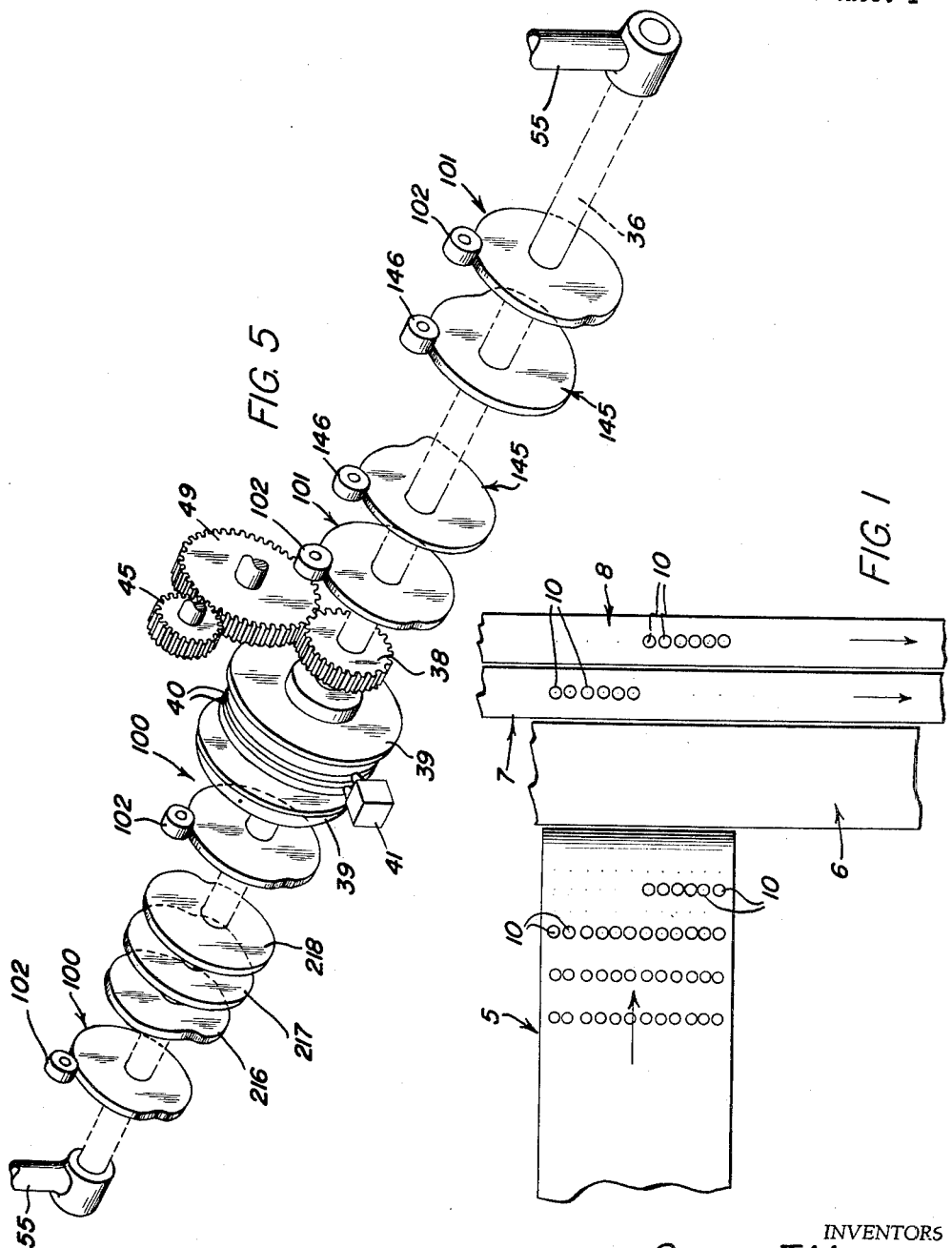
FIGURE 1 is a schematic plan view illustrating the environment of the invention, there being illustrated the relationship of the lehr conveyor, a pair of single line conveyors to which jars from the lehr conveyor are transferred, and a cullet conveyor.

The specific environment of the invention is best illustrated in FIGURE 1. After glass jars have been formed, it is necessary that the glass of the jars be annealed. This is accomplished by passing the glass jars through an annealing oven of a lehr. The lehr includes a lehr conveyor for continuously moving the jars during the annealing process. The jars are accurately placed on the lehr conveyor in rows and columns by the jar forming machine and the jars remain in this arrangement as they approach the cold or discharge end of the lehr conveyor which is illustrated in FIGURE 1 and is referred to by the reference numeral 5. Extending transversely of the lehr conveyor 5 at the discharge end thereof is a cullet conveyor, which is referred to in general by the reference numeral 6. Disposed immediately adjacent the cullet conveyor 6 and extending generally parallel to the cullet conveyor remote from the lehr conveyor is a pair of single line conveyors 7 and 8 which are in side-by-side relation and lead to an inspection station (not shown).

Figure 2:
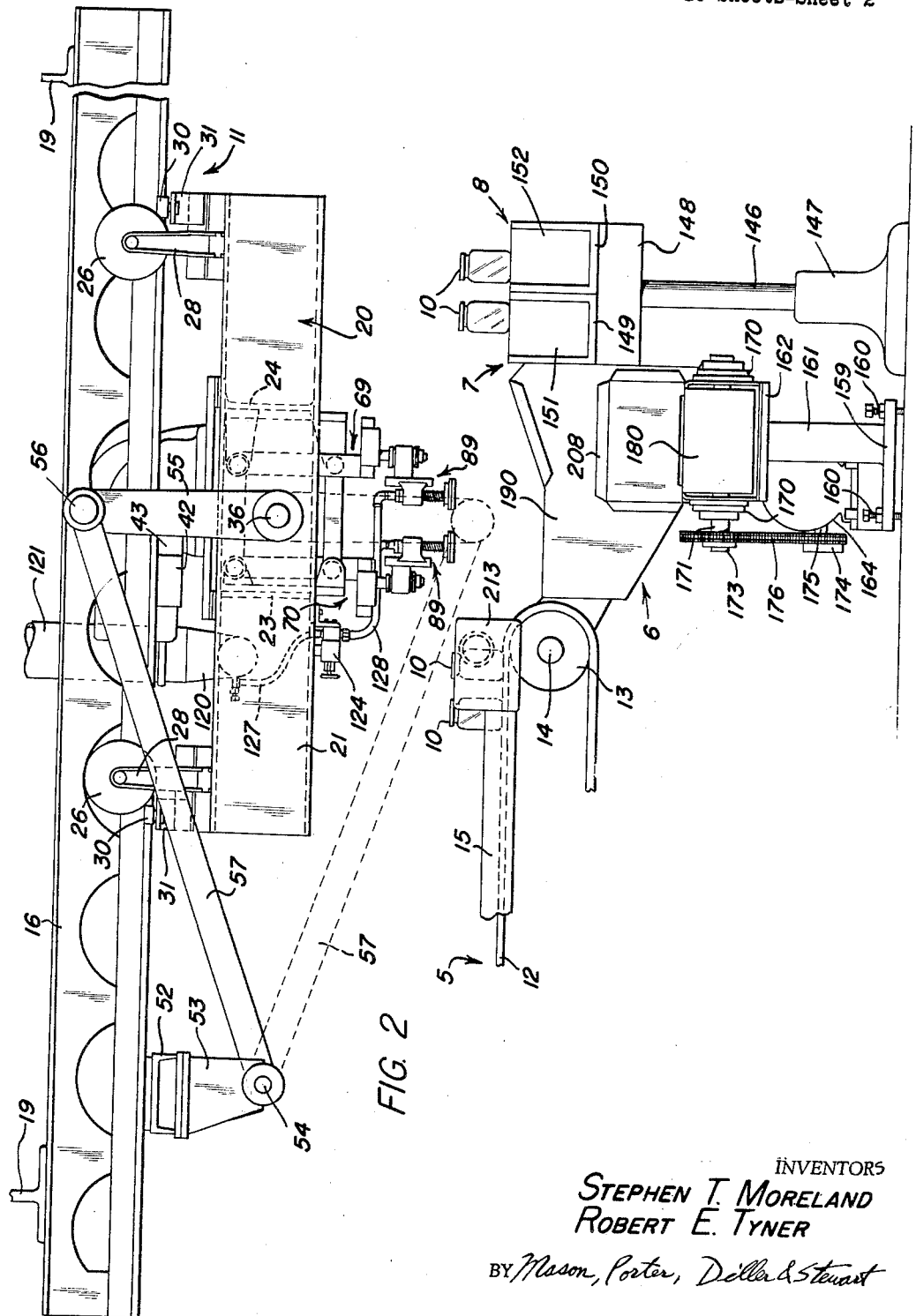
FIGURE 2 is a side elevational view of the cold or discharge end of the lehr conveyor and shows the relationship of the jar transfer and inspection mechanism with respect to the lehr conveyor, the cullet conveyor and the single line conveyors.

The arrangement of the lehr conveyor 5 with respect to the cullet conveyor 6 and the single line conveyor 7 and 8 is such that glass jars 10 conveyed by the lehr conveyor and having perfectly formed mouths are transferred to the single line conveyors with the culls of the glass jars remaining on the lehr conveyor at the discharge end thereof falling onto the cullet conveyor. In order to effect the simultaneous inspection of the mouths of the glass jars and the transfer of the glass jars having properly formed mouths, there is provided a jar transfer and inspection mechanism, which is referred to in general by the reference numeral 11 (FIGURE 2). The structure of the jar transfer and inspection mechanism will be more readily understood by first understanding generally the jar transferring operation. Accordingly, at this time it is pointed out that in the illustrated form of the jar transfer and inspection mechanism 11, generally one half of the jars 10 of a penultimate row of jars and the remaining half of the jars of an ultimate row of jars are simultaneously engaged by the jar transfer and inspection mechanism 11 and the jars accepted by the mechanism 11 will be transferred to the single line conveyors 7 and 8 with a portion of the jars of each row of jars being transferred to each of the single line conveyors.

The lehr conveyor 5, as is best shown in FIGURE 2, includes an endless belt 12 which is entrained over and drivingly supported by rollers including a roller 13 at the discharge end of the lehr conveyor. The roller 13 has a center of rotation which is referred to by the reference numeral 14. The lehr conveyor is also illustrated as having side plates 15 at opposite edges of the conveyor belt 12 as it passes along the upper run of the lehr conveyor.

The jar transfer and inspection mechanism 11 includes a pair of rails 16 which are generally horizontally disposed and arranged in straddling relation relative to the discharge end of the lehr conveyor. The rails 16 may be of any desired construction, but each must have a pair of upwardly directed supporting surfaces 17 and a pair of vertically disposed edge guide surfaces 18. The rails 16 are supported by transverse beams 19 which may be supported in any desired manner. It is to be noted that the rails 16 extend over and beyond the single line conveyors 7 and 8.

The jar transfer and inspection mechanism 11 also includes a carriage 20. The carriage 20 is formed of a pair of spaced parallel longitudinal frame members 21 and 22 which are connected together by transverse frame members 23 and 24. All of the frame members 21, 22, 23 and 24 are channel members and the frame members 23 and 24 are connected to the frame members 21 and 22 by means of angle brackets 25. As is best shown in FIGURE 2, the frame members 23 and 24 are centrally located and are in back-to-back relation.

The carriage 20 is suspended from the rails 16 by means of pairs of wheels 26 and 27 disposed at opposite ends of the frame members 21 and 22. The wheel 26 of each pair of wheels is disposed outermost whereas the wheel 27 is disposed innermost. The wheels 26 and 27 are disposed above the plane of the carriage 20 with the carriage being suspended from the wheels by means of hangers 28 and 29 which are connected to the wheels 26 and 27, respectively. The carriage 20 is restrained against movement transversely of the rails 16 by guide rollers 30 which are arranged in opposed pairs and are secured to the ends of the frame members 21 and 22 by means of brackets 31. The wheels 26 and 27 engage the supporting surfaces 17 while the rollers 30 engage the edge guide surface 18. From the foregoing, it will be readily apparent that the carriage 20 is so mounted whereby the movement thereof is rigidly controlled and thus transverse and vertical movement of the carriage 20 is eliminated.

Referring to FIGURE 4, the details of the central portion of the carriage 20, as viewed from above, will be seen. To the right of the longitudinal center of the carriage is a longitudinal brace 32 which extends between and is secured to the frame members 23 and 24. Disposed to the left of the longitudinal center of the carriage is a longitudinally extending bracket 33. The bracket 33 also extends between the frame members 23 and 24 and functions as a brace. While the brace 32 is relatively shallow and extends primarily between upper portions of the frame members 23 and 24, the bracket 33 extends substantially the full depth of the frame members 23 and 24 and has a central bearing portion 34. Overlying the bracket 33 and secured to the upper portions of the frame members 23 and 24 is a mounting plate 35, the purpose for which will be set forth hereinafter.

The jar transfer and inspection mechanism 11 also includes a main drive shaft 36 which is supported by the carriage 20. The drive shaft 36 extends transversely of the carriage 20 and is disposed intermediate the transverse frame members 23 and 24. Carried by the frame members 21 and 22 in alignment with the bearing portion 34 are aligned bearing members 37. The drive shaft 36 extends through the bearing portion 34 and the bearing members 37 and is rotatably journalled therein with the ends of the drive shaft extending outwardly from the bearing members 37.

A gear 38 is rotatably journalled on the drive shaft 36 to the left of the brace 32 (FIGURE 4). The gear 38 is part of a conventional electric clutch 39 which, when energized, will drivingly connect the gear 38 to the drive shaft 36. Associated with the electric clutch is a conventional electric brake 40 which includes a braking head 41 supported by the bracket 33. The electric clutch 39 and the electric brake 40 are commercially available as a unit from Warner Electric Clutch and Brake Co. of Beloit, Wisconsin, and are disclosed in the Warner catalog drawing No. CW-I-25112. The electric brake 40 and the electric clutch 39 are so controlled whereby when the electric clutch is engaged, the electric brake is disengaged, and when the electric clutch is disengaged, the electric brake is automatically engaged to stop instantaneously the movement of the carriage 20.

The drive shaft 36 is driven by means of an electric motor 42 (FIGURE 3) which is mounted on the mounting plate 35. The electric motor 42 has an integral reduction gear unit 43 which, in turn, has an output shaft 44 disposed above and parallel to the drive shaft 36. Carried by the output shaft in alignment with the gear 38 is a drive gear 45, the drive gear 45 being spaced from the gear 38.

Pivotally mounted on the drive shaft 36 adjacent the gear 38 is a hub portion 46 of a support bar 47. The support bar extends upwardly from the drive shaft 36 immediately adjacent to the brace 32. Projecting from the upper end of the support bar 47 is a stub shaft 48 which is disposed parallel to the drive shaft 36 and the output shaft 44 and is offset from these shafts. Rotatably journalled on the stub shaft 48 is an intermediate gear 49 which is aligned with the gears 38 and 45. The gear 49 is held in meshed engagement with the gears 38 and 45 by releasably securing the support bar 47 against pivoting. As is shown in FIGURE 9, the brace 32 has an arcuate slot 50 through which a clamp bolt 51 passes, the clamp bolt being threaded into the support bar 47 and clamping the support bar against the brace.

Referring now to FIGURES 2 and 3, it will be seen that secured to the undersides of the rails 16 to the left of the carriage 20, as is best shown in FIGURE 2, is a transverse member 52. The transverse member 52 has ends projecting outwardly of the rails 16, as is best shown in FIGURE 3. Depending from the ends of the transverse member 52 are yoke type hangers 53 which support horizontally disposed and aligned pins 54.

The outer ends of the drive shaft 36 have secured thereto crank arms 55 which are in phase with each other. The ends of the crank arms 55 remote from the drive shaft 36 are provided with outwardly projecting pins 56. Pivotally mounted on each of the pins 56 is one end of a connecting rod 57. The opposite end of the connecting rod 57 is pivotally mounted on a respective one of the pins 54. Since one end of each of the connecting rods 57 is anchored, when the drive shaft 36 is rotated, the carriage 20 will be reciprocated.

As was mentioned above, the transfer and inspection mechanism 11 includes two sets of pick-up heads. These two sets each extend across one half of the carriage 20.

Referring now to FIGURES 4 and 7, it will be seen that there are illustrated the details of the means provided for mounting and shifting the support for one set of pick-up heads. As is best illustrated in FIGURE 7, secured to the transverse frame member 23 is a mounting bracket 58. The mounting bracket 58 includes a vertical portion 59 which is directly secured to the transverse frame member 23. Extending toward the transverse frame member 24 from the vertical portion 59 is an upper ear 60 and a lower ear 61 which are vertically aligned.

Pivotally connected to the upper ear 60, by means of a pivot pin 62, is an upper link 64. A lower link 63 is pivotally connected to the lower ear 61 by means of a pivot pin 65. Pivotally connected to the end of the upper link 64 remote from the ear 60, by means of a pivot pin 66, is the upper end of a lift arm 67. The lower portion of the lift arm 67 is pivotally connected to the lower link 63 by means of a pivot pin 68. The links 63 and 64 being of equal length and the spacing between the pivot pins 66 and 68 being the same as the spacing between the pivot pins 62 and 65, the linkage formed is of the parallelogram type.

Referring once again to FIGURE 4, it will be seen that secured to the transverse frame member 23 are two pairs of linkages which include the aforementioned parts. These linkages are spaced apart with one of the linkages being disposed adjacent the longitudinal frame member 21 and the other of the linkages being disposed adjacent the bracket 33. These linkages are referred to in general by the reference numeral 69.

The other set of pick-up heads is supported by spaced linkages each referred to in general by the reference numeral 70. The linkages are identical to the linkages 69 with the exception that the mounting brackets 58 of the linkages 70 are secured to the transverse frame member 24, as is best shown in FIGURES 4 and 8. One of the linkages 70 is disposed adjacent the brace 32 and the other of the linkages 70 is disposed adjacent the longitudinal frame member 22.

Referring now to FIGURES 16 and 17, it will be seen that the lower end of each lift arm 67 is provided with a dovetailed cross-section extension 71 which extends normal to the lift arm 67. Carried by the extension 71 is a hanger which is referred to in general by the reference numeral 72. The hanger 72 includes a mounting block 73 which has an upper recess 74 configured to receive a portion of the extension 71. The extension 71 is clamped in the mounting block 73 by means of a gib 75 which is retained in place by a pair of fasteners 76 passing through the gib and threadedly engaged in the mounting block 73. By releasing the gib 75, the mounting block 73 may be slid longitudinally along extension 71.

Secured to the underside of the mounting block 73, in alignment with a vertical plane passing through the centers of the extension 71 and the lift arm 67 is a hanger member 77. The hanger member 77 is externally threaded and is in the form of an elongated bolt. Threadedly engaged on the hanger member 77 in opposed spaced relation is a pair of clamp members 78 and 79.

As indicated above, the linkages 69 and the linkages 70 are arranged in pairs. Accordingly the lift arms 67 are also arranged in pairs. Extending between each pair of lift arms 67 is a support bar 80. As is best shown in FIGURES 2 and 3 the support bar 80 for the linkages 69 faces to the left whereas the support bar 80 for the linkage 70 faces to the right. Each of these support bars 80 has secured thereto a pair of projecting mounting blocks 81. The mounting blocks 81 are spaced apart along the support bar 80 a distance equal to the spacing of the hangers 72. Each of the mounting blocks 81 is provided with a vertical bore 82 through which an intermediate part of an associated hanger member 77 passes. The mounting block 81 is maintained in place on its hanger member by means of the clamp members 78 and 79.

Extending the full length of the support bar 80 on the side thereof opposite from the mounting blocks 81 is a dovetailed slot 83. Seated in the dovetailed slot 83 is a dovetailed cross-sectional base 84 of an individual pick-up head mounting block 85. As is best shown in FIGURE 19, the base 84 is of a greater length than the mounting block 85. Extending through the base 84 on opposite sides of the mounting block 85 are internally threaded bores 86 in which there are threadedly engaged set screws 87 which extend through the base 84 and bear against the support bar 80 to retain the mounting block 85 in a fixed position with respect to the support bar 80. It is to be noted that the dovetailed slot 83 has a narrow inner recess 88 in which the ends of the set screws 87 seat.

It is to be understood that there is one mounting block 85 for each of the pick-up heads and the mounting block is individually adjusted relative to the support bar. As is best illustrated in FIGURE 3, each of the support bars 80 carries 12 pick-up heads. Of course, the number of pick-up heads may be varied as is desired.

Each of the pick-up heads is referred to in general by the reference numeral 89 and includes an elongated tubular member 90 which passes downwardly through the vertical bore 91 of its associated mounting block 85. The tubular member 90 has threadedly secured on the lower end thereof a block 92 which is provided adjacent the lower end thereof with an annular projection 93. Removably engaged over the annular projection 93 is a ring portion 94 of a jar engaging pad 95. The tubular member 90 is provided at the upper end thereof with an elbow 96, which, in turn, has connected thereto a length of tubing 97 which will be connected to a vacuum source in the manner to be described in more detail hereinafter. Both the block 92 and the pads 95 are provided with aligned bores 98 and 99, respectively, which are communicated with the interior of the tubular member 90 so that a vacuum may be produced below the pad 95.

As is clearly illustrated in FIGURE 7, each of the linkages 69 is supported by means of a cam assembly 100, there being one cam assembly 100 for each of the linkages 69. Also, as is shown in FIGURE 5, there is provided a separat cam assembly 101 for each of the linkages 70. Carried by the link 64 of each of the several linkages 69 and 70 is a follower 102 which engages its respective cam assembly.

Referring now to FIGURES 14 and 15, it will be seen that there is illustrated a typical cam assembly which for purposes of description may be considered to be one of the cam assemblies 100. The cam assembly 100 includes a hub 103 which is mounted on the drive shaft 36 for rotation therewith and is secured thereto by means of a key 104 seated in a keyway formed in the shaft 36. The hub 103 includes an enlarged portion 106 which defines a shoulder 107. Mounted on the hub 103, is a cam element 108 which is formed in halves. The cam element 108 includes a hub 109 which is seated on the hub 103 and bears against the shoulder 107. The outer portion of the hub 109 remote from the cam element 108 is beveled at 110. The hub 103 is provided with a plurality of circumferentially spaced internally threaded bores 1110 and threadedly engaged in each of the bores 1110 is a screw 111 having a tapered head 112. The taper of the head 112 is complementary to the bevel 110. The cam element 108 is placed on the hub 103 while the screws 111 are loose and then the cam element 108 is rotated to its desired position with respect to the hub 103. After this the screws 111 are tightened down with the result that they clamp the cam element 108 in place on the hub 103.

Since the jars 10 are picked up by individual ones of the pick-up heads 89 and since portions of two rows of jars are simultaneously picked up, it is necessary that the spacing between the centers of the two sets of pick-up heads 89 be substantially the same as that between the rows of jars 10, and the spacing between the centers of individual pick-up heads 89 must be substantially the same as the spacing between the centers of jars 10 in a row. Further, it is necessary that the underside of each pad 95 be spaced slightly above the tops of the jars 10 with the spacing between each pad 95 and a respective jar being within the range of vertical movement of the individual pick-up head 89. The spacing between the rows of pick-up heads 89, as well as the centering of the pick-up is accomplished by sliding the hangers 72 along the lift arm extensions 71 to control the positions of the support bars 80 with respect to the carriage 20 in the direction of the movement of the carriage. The support bars 80 and the pick-up heads 89 carried thereby are vertically adjusted by vertically adjusting the positions of the mounting blocks 81 on the hangers 72. On the other hand, the positions of the pick-up heads 89 transversely of the carriage 20 and the lehr conveyor 5 are individually controlled by sliding the individual mounting block 85 relative to its respective support bar 80 and retaining the mounting block in the adjusted position by means of the set screws 87.

It will be readily apparent that the heights of all of the jars 10 and the vertical positions of the undersides of all of the pads 95 cannot be the same. In view of this, each pick-up head 89 is mounted for relative vertical movement with respect to its respective mounting block 85. This is accomplished by freely mounting the tubular member 90 of each pick-up head 89 for guided vertical movement through its associated mounting block 85. Downward movement of the individual pick-up head 89 is limited by a nut 114 threadedly engaged on an externally threaded upper portion 115 of the tubular member 90 and normally being seated on the upper surface of its associated mounting block 85. Each pick-up head 89 is urged downwardly and is resiliently restrained against vertical movement relative to its respective mounting block 85 by a coil spring 116 carried by a lower portion of the tubular member 90 with the opposite ends of the spring 116 compressively engaging the underside of the mounting block 85 and the upper surface of the block 92. The adjustment of the nut 114 is maintained by means of a lock nut 117 also threadedly engaged on the externally threaded upper portion 115.

The effective throw of each of the cams 100 and 101 is such that the vertical movement of each of the mounting blocks 85 is greater than the maximum spacing between any one pad 95 and its respective jar 10. Thus, as the pick-up heads 89 move downwardly, each of the pads 95 will move downwardly into engagement with the open mouth of an associated one of the jars 10. When the pad 95 enters into pressure contact with the jar 10, downward movement of the pick-up head 89 of which the pad 95 is a part stops and the spring 116 thereof is compressed by further downward movement of the associated mounting block 85. This action not only assures the engagement of every pad 95 with its respective jar 10, but also provides resiliently urged compressive engagement between the resilient pad 95 and the mouth of the jar 10 to form a seal between the pad 95 and a jar 10 having a properly formed mouth.

Referring now to FIGURES 2, 4 and 9 in particular, it will be seen that the carriage 20 also carries an air manifold 118 which is mounted adjacent the transverse frame member 23 remote from the transverse frame member 24. The air manifold 118 is supported by a plurality of straps 119 which are secured to the upper portion of the transverse frame member 23 by means of fasteners 120 (FIGURE 9). The central portion of the manifold 118 has extending upwardly therefrom a tubular fitting 120 to which there is connected a flexible supply line 121. The supply line 121 is retained on the fitting 120 by means of a clamp 122 and the other end of the supply line (not shown) is connected to a suitable pressurized air source.

Secured to the lower flange of the transverse frame member 23 is a transversely extending angle bracket 123. Suitably mounted on the angle bracket 123 is a plurality of solenoid operated valves 124 which are spaced transversely of the carriage 20. Each of the valves 124 also includes a manual control 125 for varying the opening therethrough. The manifold 118 is provided with a plurality of transversely spaced aspirator type fittings 126 to provide the desired vacuum for the pick-up heads 89, there being one fitting 126 for each valve 124. The valves 124 are connected to the fittings 126 by means of flexible vacuum lines 127. The number of valves 124 corresponds to the number of pick-up heads 89 and each pick-up head 89 is connected to its respective valve 124 by means of a flexible vacuum line 128 which is connected to the tubing 97 of the pick-up head 89.

From the foregoing, it will be readily apparent that a suction exists in the bore 99 of each pad 95. As each pad 95 engages a jar 10, if a seal is formed between the pad 95 and the jar, and the jar has no cracks or other openings which will permit the rapid influx of air, a vacuum connection between the pad 95 and the jar 10 will be formed and the jar may be lifted by the pick-up head 89. On the other hand, if the mouth of the jar 10 is improperly formed or the jar has other openings therein, an insufficient lifting force will be exerted onto the jar to lift the jar from the lehr conveyor. In this manner the transfer and inspection mechanism 11 will inspect jars for the above-mentioned type of defects during the transferring operation.

The transfer and inspection mechanism so operates during a jar transferring operation that the remaining jars of an ultimate row of jars and approximately one half of the jars of a penultimate row of jars are removed simultaneously. At the time the jars of the ultimate row of jars are engaged, the jars are disposed substantially along the center of rotation 14 of the roller 13 and as the lehr conveyor 5 advances, the culls of the ultimate row of jars will fall onto the cullet conveyor 6. However, culls of the one half of the penultimate row of jars left on the lehr conveyor will have progressed only to the line of the original ultimate row and would normally interfere with the transfer of jars from the new penultimate row. It is therefore necessary that the culls from the penultimate row be transferred to the cullet conveyor 6 at the time the jars are transferred to the single line conveyors 7 and 8.

A pusher bar assembly 130 is carried by the carriage 20 for removing the culls of the penultimate row of jars from the lehr conveyor 5 during the jar transferring operation, as is best illustrated in FIGURES 4 and 10. The pusher bar assembly 130 includes a pair of spaced linkages 131 which are very similar to the linkages 69 and 70, the linkages 131 being disposed adjacent to and between the linkages 70. Each of the linkages 131 includes a mounting bracket 132 secured to the transfer frame member 24. The mounting bracket 132 includes a pair of vertically spaced and aligned, horizontally disposed ears 133 and 134. Pivotally connected to the ear 133, which is disposed uppermost, by means of a pivot member 135, is an upper link 136. A similar lower link 137 is pivotally connected to the ear 134, which is disposed lowermost by means of a pivot member 138. A depending lift arm 139 is pivotally connected to the links 136 and 137 by means of pivot members 140 and 141, respectively, to form a parallelogram type linkage.

The lower end of each of the lift arms 139 terminates in a generally horizontal clamp 142 in which there is secured the upper end of a hanger 143. Extending between and secured to the hangers 143 is a pusher bar 144. It is to be understood that the pusher bar will have a length substantially equal to the overall width of the set of pick-up heads 89 with which the pusher bar 144 is associated. Each of the linkages 131 is supported by a cam assembly 145 (FIGURE 10) and a follower 146, the follower 146 being carried by the upper link 136 and riding on the cam of the cam assembly 145. The cams of the two cam assemblies 145 are identical and serve to raise and lower the pusher bar 144 in timed relation to the movement of the carriage 20 in a manner to be described in more detail hereinafter.

The specific details of the single line conveyors 7 and 8 have not been illustrated. However, as is illustrated in FIGURE 2, the conveyors 7 and 8 may have common supports each of which includes a standard 146 having a suitable base 147 and a cross bar 148 at the upper end thereof. Extending between and supported by the cross bars 148 are frames 149 and 150 for the conveyors 7 and 8, respectively. The conveyors 7 and 8 are of the endless belt type and include belts 151 and 152, respectively, with the upper surfaces of the belts being disposed substantially coplanar with the upper surface of the lehr conveyor belt 12. It is to be understood that the single line conveyors 7 and 8 will lead to inspection stations (not shown) where the glass jars will be visually inspected for defects not ascertainable by the transfer and inspection mechanism 11.

The details of the cullet conveyor 6 are best illustrated in FIGURES 2, 3 and 11. The cullet conveyor 6 includes a pair of spaced supports generally referred to by the numerals 153 and 154. The support 154 is at the right end of the cullet conveyor 6 (FIGURE 3) and includes a base plate 155 supported by levelling screws 156. Extending upwardly from the base plate 155 is a standard 157 which terminates at its upper end in a cross bar 158. The support 153 is very similar in construction to the support 154 and includes a base plate 159 having levelling screws 160, a standard 161 and a cross bar 162. The base plate 159, however, is both wider and longer than the base plate 155, the base plate 159 projecting to the left of the standard 161, as viewed in FIGURE 2. Mounted on the base plate 159 is a frame 163 which supports a combination electric motor and reduction gear unit 164.

Referring to FIGURE 11 in particular, the cullet conveyor 6 is illustrated as including a generally rectangular housing generally referred to by the numeral 165. The housing 165 includes a bottom wall 166, upstanding side walls 167 and 168, and a top wall 169 with the housing 165 being supported by the bottom wall 166 which is seated on and secured to the cross bars 158 and 162. Secured to the side walls 167 and 168 at the left ends thereof (FIGURE 3) are bearing plates 170 in which there is rotatably journalled a shaft 171 supporting a drive roller 172. The shaft 171 has a sprocket 173 mounted thereon in alignment with a sprocket 174 carried by a drive shaft 175 of the combination electric motor and reduction gear unit 164. A drive chain 176 is entrained over the sprockets 173 and 174 to drivingly connect together the shafts 171 and 173.

At the right end of the housing 165 (FIGURE 3) there are disposed longitudinally adjustable bearing assemblies 177 which are mounted on the side walls 167 and 168. Extending between and rotatably supported by the bearing assemblies 177 is an idler shaft 178 which carries an idler roller 179. Entrained over the drive roller 172 and the idler roller 179 is an endless conveyor belt 180 which has an upper run resting on the top wall 169 and a lower run disposed intermediate the top wall 169 and the bottom wall 166. The lower run of the conveyor belt 180 is supported adjacent the rollers 172 and 179 by a pair of intermediate rollers 181 which are carried by shafts 182 extending between and supported by the side walls 167 and 168.

Extending above the housing 165 is a second housing 183 of which the top wall 169 functions as the bottom wall. The housing 183 includes a relatively high side wall 184 which is an extension of the side wall 168, the side wall 184 being supported by means of vertical frame members 185 which have their lower ends secured to the side wall 168. It is to be noted that the side wall 184 does not extend the full length of the housing 165 although it does extend the full width of the lehr conveyor 5. The housing 183 also includes a short side wall 188 which constitutes an extension of the side wall 167. The side wall 188 is supported at least at its ends by vertical frame members 189 which are secured to the side wall 167.

The housing 183 also includes a pair of end walls 190 and 191, the end wall 190 being disposed at the left end and the end wall 191 being disposed at the right end, as viewed in FIGURE 3. Each of the end walls 190 and 191 extends outwardly of the side wall 188 and is braced on the inner surface thereof by a peripheral frame 192 (FIGURE 11). Extending between the upper corners of the end walls are frame members 193 and 194, the frame member 194 being secured to the side wall 184 below the upper edge of the side wall 184. Another frame member 195 extends between the upper edges of the end walls 190 and 191, the frame member 195 being disposed slightly to the right of frame members 189. The lower left corners of the end walls 190 are connected together by a frame member 196 and another frame member 197 extends between the frame members 189 adjacent the upper edge of the side wall 188. The frame members 189 extend above the side wall 188 and each of the end walls 190 and 191 has a diagonal frame member 198 which extends from the upper left corner thereof (FIGURE 11) to the upper end of a respective one of the frame members 189. The lower portions of the diagonal frame members are connected together by a frame member 199.

The housing 183 has a partial top wall 200 which slopes downwardly from the upper edge of the side wall 184 down to the frame member 195. The left half of the housing 183 (FIGURE 11) is open and includes an upper chute 201 which overlies and is secured to the frame members 193 and 199. The upper end of the chute 201 terminates immediately adjacent the lehr conveyor belt 12 at the discharge end of the lehr conveyor 5 and above the center of rotation 14 of the roller 13. The lower end of the chute 201 terminates in a downwardly directed flange 202 which overlies the cullet conveyor belt 180.

The left part of the housing 183 (FIGURE 11) is normally closed by a flexible baffle 203 which is clamped between the top wall 200 and the frame member 195 and which has the lower edge thereof abutting the flange 202. The baffle 203 has a solid upper portion 204 to which there are integrally connected elongated individually bendable depending strips 205. The baffle 203 not only serves to partially seal the housing 183, but also retards the movement of culls from the chute 210 onto the cullet conveyor belt 180.

A second chute 206 underlies the chute 201 and is disposed at a lesser angle to the horizontal than the chute 201. The chute 206 overlies and is supported by the frame members 196 and 197. The upper end of the chute 206 terminates adjacent to and below the lehr conveyor belt 12 below the center of rotation 14 of the roller 13 whereby fine cull particles which adhere to the lehr conveyor belt 12 as it passes the chute 201, will fall off onto the chute 206. The lower end of the chute 206 terminates in overlying relation to the cullet conveyor belt 180.

The end walls 190 and 191 have openings 207 in the lower portions thereof through which the upper run of the cullet conveyor belt 180 passes. This leaves a right hand portion of the cullet conveyor belt 180 exposed (FIGURE 3). Although the housing 183 terminates short of the left end of the cullet conveyor belt 180, the upper run of the cullet conveyor belt 180 is not exposed, there being provided a housing extension 208 secured to the end wall 190. The left end of the housing extension 208 is connected to a housing 209 of a cullet carry off conveyor 210. Suitably connected to the housing 209 is a pipe 211 through which air is drawn to provide a lesser air pressure within the cullet conveyor 6 than outside thereof. This greatly reduces the tendency for the small cull particles to escape from the cullet conveyor 6 into the surrounding work area. If desired, the pipe 211 may be part of a machine exhaust system.

The controls for the transfer and inspection mechanism 11 includes a photo-electric cell control assembly which is suitably mounted relative to the lehr conveyor 5. The photo-electric cell control assembly includes a light source 212 and a conventional light sensitive cell unit 213 disposed in opposed relation above the upper run of the lehr conveyor belt 12 where the light beam from the light source 212 to the light sensitive cell unit 213 may be interrupted by jars 10 moving along the lehr conveyor 5. The axis of the light beam from the light source 212 is aligned with the center of rotation 14 of the roller 13 (FIGURE 2).

In FIGURE 4 there is illustrated a cam assembly 214 mounted on the shaft 36 intermediate the cam assemblies 100. The cam assembly 214 includes an elongated hub 215 on which there are mounted in spaced relation cams 216, 217 and 218. Associated with and actuated by the cams 216, 217 and 218 are limit switches LS1, LS2 and LS3, respectively, which are mounted on the transverse frame member 23.

*Electrical System*

The electrical system for the transfer and inspection mechanism 11 is best understood by reference to the wiring diagram of FIGURE 13. In order that the wiring may be best traced out the main wires are provided with appropriate identifying letters. The electric motor 42, the electric motor for the lehr conveyor 5 (not shown, but referred to on the wiring diagram by the numeral 219) and the electric motor for the blower of the vacuum source (not shown, but referred to on the wiring diagram by the numeral 220) are all of the three phase type and may operate on either 220 volts or 440 volts. Accordingly, a suitable three phase power source is provided including line terminals L1, L2 and L3 to which there are connected line wires A, B and C, respectively. Mounted in the lines wires A, B and C is a master control switch 221 and beyond the switch 221 each of the line wires is provided with a fuse 222.

The carriage motor 42 is connected to the line wires D, E and F, respectively. Mounted within the wires D, E and F for controlling the operation of the carriage motor 42 is a remotely operable motor switch MS1. Also, the wires D and F are provided with fuses 223 beyond the motor switch MS1. The blower motor 220 is connected to the line wires A, B and C by wires G, H and I in which there is mounted a motor switch MS2 for controlling the operation of the blower motor 220. The wires G and I are fused beyond the motor switch MS2 by fuses 224. Also, the conveyor motor 219 is connected to the line wires A, B and C by wires J, K and L in which there is positioned a motor switch MS3 for controlling the operation of the conveyor motor 219. The wires J and L are fused beyond the motor switch MS3 by fuses 225.

The line wires A and C are terminally connected to the high side of a transformer 226 which reduces the line voltage to single phase 110 volts. Connected to the low side of the transformer 226 are wires M and N. The wire N is provided with a fuse 227 immediately adjacent its connection to the transformer 226.

Extending between the wires M and N and connected thereto in parallel is a wire 228 in which there is positioned an actuator 229 for the motor switch MS2. Energization of the actuator 229 is controlled by a manually operable switch 230 positioned in the wire 228. Connected in parallel to the actuator 229 by a wire extending between the wires M and 228 is a red light 231 to indicate that the motor switch MS2 is closed or opened. Connected in parallel with the wire 228 and to the wires M and N is a wire 232 in which there is mounted an actuator 233 for the motor switch MS3. The energization of the actuator 233 is controlled by means of a manually operated switch 234. A red light 235 is mounted in parallel to the actuator 233 to indicate the position of the motor switch MS3.

The operation of the motor switch MS1 is controlled by an actuator 236 mounted in a wire 237 connected to the wires M and N parallel to the wires 228 and 232. The energization of the actuator 236 is manually controlled by means of a switch 238 also positioned in wire 237. In order that the carriage motor will operate only when the conveyor motor 219 and the blower motor 220 are operating, also positioned in the wire 237, are solenoid operated switches 239 and 240 which are controlled by the switches 230 and 234, respectively. Thus the actuator 236 cannot be energized unless the actuators 229 and 233 are both energized. A red light 241 is connected in parallel with the actuator 236 to indicate the position of the motor switch MS1.

The light source 212 has a pair of line terminals 242 and 243 to which there are connected wires 244 and 245, respectively. The wires 244 and 245 are, in turn, connected to the wires M and N, respectively, to energize the light source 212. The conventional light sensitive cell unit 213 has a pair of line terminals 246 and 247 which are connected to the wires M and N by wires 248 and 249, respectively. The light sensitive cell unit 213 also includes, among other conventional components, a pair of terminals 250 and 251 to which are connected wires 252 and 253, respectively, which are internally of the light sensitive cell unit 213. The wires 252 and 253 are connected to the contacts 254 and 255 which are controlled by the photo-electric cell of the light sensitive cell unit 213 to close when the light rays from the light source 212 to the light sensitive cell unit 213 are interrupted.

The electrical system also includes wires O, P and Q. The terminals 250 and 251 of the light sensitive cell unit 213 are connected to the wires P and Q by wires 256 and 257, respectively. A first end of the wire O is connected to a terminal of a switch 258 and a first end of the wire Q is connected to a terminal of a switch 259. The other terminals of the switches 258 and 259 are connected together by a wire 260. The wire P is connected to the wire O adjacent the switch 258 and incorporated in the wire P adjacent its connection with the wire O is a switch 261. Extending between the wires M and N and connected thereto in parallel is a wire 262 in which there is incorporated a switch 263 and a red light 264. The switches 258, 261 and 263 are connected together by a single operator 265 which is so connected to the switches 258, 261 and 263 that when the switch 258 is open, the switches 261 and 263 are closed, and when the switches 261 and 263 are open, the switch 258 is closed. The switch 263 controls only the red light 264 to indicate the position of the switch 261.

The wires M and N lead to the carriage 20 with the wire M terminating in a feeder wire 266 to which first wires of solenoid valves 124 of one set of solenoid valves are connected. The wire N is terminally connected to one terminal of the limit switch LS3 which has connected to the other terminal thereof a feeder wire 267 to which second wires of the above mentioned solenoid valves 124 are connected. Also connected to the wire M is another feeder wire 268 which has associated therewith a feeder wire 269. The feeder wire 269 is connected to the wire N through the limit switch LS2 and connected to the feeder wires 268 and 269 in parallel are the solenoid valves 124 of the other set of solenoid valves. From the foregoing, it will be readily apparent that the operation of the sets of solenoid valves 124 is controlled by the limit switches LS2 and LS3.

The carriage also carries a control for the electric clutch 39 and the electric brake 40, the control being a Warner CW-1000 control and being generally referred to by the numeral 270. The control 270 is a conventional control for the conventional electric clutch 39 and the conventional electric brake 40, all of which are manufactured by the Warner Electric Brake and Clutch Co. of Beloit, Wisconsin. The control 270 includes a rectifier 271 having A.C. terminals 273 and 275 and D.C. terminals 272 and 274. The wire M is connected to the terminal 273 by a wire 276 and the wire N is connected to the terminal 275 by a wire 277 in which there is incorporated a fuse 278. The wire Q is connected to the terminal 272 and the wire O is connected to the terminal 274 with there being incorporated in the wire O a relay coil 279.

The wire P terminates at a terminal of the limit switch LS1 which has connected to the other terminal thereof a wire 280 whose opposite end is connected to the wire Q. Also connected to the wire Q as a continuation of the wire 280 is a feeder wire 281. A second feeder 282 is connected to the wire O. Connected in parallel to the feeder wires 281 and 282 are a clutch control unit, referred to generally by the numeral 283, and a brake control unit, referred to generally by the numeral 284.

*Operation*

In order to fully understand the operation of the transfer and inspection mechanism 11, it is first necessary to realize that the rate of movement of the jars 10 along the lehr conveyor 5 is such that the transfer and inspection mechanism 11 makes a complete cycle of operation and stops before the next row of jars 10 advances to the transfer position. Also, before initiating the operation of the transfer and inspection mechanism, the cullet conveyor 6 and the single line conveyors 7 and 8 must be operating, and the blower creating vacuum at pick-up heads must be operating. The operation of the transfer and inspection mechanism 11 is initiated by closing the master control switch 221. Then the switches 230, 234, 261 and 263 are closed. Finally the switch 238 is closed to operate the carriage motor 42.

Referring now to FIGURE 6 in particular, it will be seen that the right hand horizontal dead center position of the crank arms 55 is considered the 0° position and the at rest position of the carriage 20 is 352°. In other words, the carriage 20 is slightly to the right of its maximum movement to the left (FIGURE 2). At this time the pads 95 of the pick-up heads 89 are elevated approximately ¼ inch above the jars 10 so as to clear the jars. Also, the limit switch LS1 is open and the limit switches LS2 and LS3 are closed. This results in the clutch 39 being released and the brake 40 being actuated, and the vacuum source being connected to the pick-up heads 89.

The lehr conveyor 5 moves an ultimte row of jars into alignment with the light source 212 and the light sensitive cell unit 213 to interrupt the light rays therebetween with the resultant closing of the contacts 254 and 255. This results in bypassing of the limit switch LS1 and energizing relay 279 which opens contacts in the brake circuit and closes contacts in the clutch circuit thus operating the clutch 39 and releasing the brake 40 to start movement of the carriage 20. The carriage 20 first moves to the left until the crank arms 55 are in the 0° position and the carriage 20 is in its back dead center position. At the same time the pick-up head pads 95 have moved downwardly to engage the mouths of the jars 10 and the pusher bar 144 is started downwardly.

As the crank arms 55 continue to swing, the carriage movement is now from the left to the right. When the crank arms are at the 4° position, the carriage 20 has traveled forwardly only 0.0240 inch of the full travel of 32 inches. At this time the support bars 80 for the pick-up heads 89 have reached their lowermost positions. The configurations of cams of the cam assemblies 100 and 101 are such that the support bars 80 are lowered ⅜ inch. Since the original clearance between the pads 95 and the jars 10 is ¼ inch, the additional downward movement of the support bars 80 results in the compressing of the springs 116 and assures the desired contact between all of the pads 95 and their respective jars.

When the crank arms 55 reach the 8° position, the carriage 20 has moved forwardly 0.1072 inch and the support bars 80 have moved upwardly to begin lifting the pick-up heads 89. At the 16° position of the crank arm 55, the carriage 20 has traveled forward 0.4176 inch and at this time the pick-up heads 89 have been lifted to their uppermost positions with the jars 10 supported above the lehr conveyor belt 12. The limit switch LS1 is now closed to continue the energization of the clutch 39. When the crank arms 55 reach the 24° position, the carriage 20 has moved 0.9376 inch and the pusher bar 144 has reached its lowermost position.

The rotation of the drive shaft 36 continues and when the crank arms 55 reach the 106° position, the carriage 20 has traveled forwardly 17.8848 inches. At this time the culls of the jars have been pushed off of the lehr conveyor belt 12, and the pusher bar 144 starts to rise. When the crank arms 55 reach the 180° position, the carriage 20 will have traveled the full 32.00 inches. At this time the two sets of pick-up heads 89 are in positions overlying the single line conveyors 7 and 8 and the limit switches LS2 and LS3 are open to deenergize the solenoid valves 124 and thus release the jars 10. While the simultaneous opening of the limit switches has been described, if desired, the cam 217 may be rotated relative to the cam 218 so that the jars deposited on the single line conveyor 7 will be released in advance of the jars deposited on the single line conveyor 8 whereby the spacing between the single line conveyors 7 and 8 may be varied.

When the crank arms 55 reach the 204° position, the carriage 20 is 30.169 inches from its starting position and limit switches LS2 and LS3 are again closed to energize the solenoid valves 124 and open the vacuum line to the pick-up heads 89. The carriage has returned to 9.0656 inches from its starting position when the crank arms 55 have reached the 286° position and the pusher bar 144 is elevated to its highest position. When the crank arms 55 reach the 352° position, the carriage has returned to its starting position and the limit switch LS1 is opened to disengage the clutch 39 and engage the brake 40 to stop the rotation of the drive shaft 36. A cycle of operation has now been completed and the transfer and inspection mechanism now awaits the positioning of a next row of jars 10 for transfer.

When it is desired to temporarily stop the operation of the transfer and inspection unit 11 during a cycle of operation, the switch 261 is opened to release the clutch 39 and energize the brake 40. If it is now desired to operate the transfer and inspection unit 11 under manual control, the carriage may be advanced by closing the switch 259 which results in the by-passing of the switch 261, the switch 258 being closed when the switch 261 is open. When it is desired to completely stop the operation of the invention, the switches 230, 234, 238 and 261 should be opened, after which the master control switch 221 should be opened. At this time, it is pointed out that although the switches 230, 234, 238 and 261 have been illustrated as simple switches, they will be of the type having "start" and "stop" buttons for their actuation.

From the foregoing, it will be readily apparent that due to the crank action of the conveyor drive, the movement of the carriage 20 will be described by a harmonic motion curve which is very desirable as there will be no abrupt forces tending to jar the carriage 20. Also, because of the novel mounting of the cams of the various cam assemblies, the cams may be readily adjusted relative to the drive shaft or replaced to vary the timing of the operation of components of the transfer and inspection mechanism. In addition to this, the pick-up heads 89 are so adjustably mounted that the positions thereof may be varied depending on the article to be picked up and they may be selectively positioned in two rows, as illustrated, or in a single row.

While an example form of the invention is disclosed herein, it is to be understood that the structural details and arrangement of parts may be variously modified without departing from the spirit and scope of the invention as defined in the appended claims.

We claim:

1. A combination with a conveyor system for individual articles wherein said conveyor system includes a supply conveyor for delivering a plurality of articles in transverse rows, said supply conveyor having a discharge end; a pair of receiving conveyors extending transversely of said supply conveyor at said discharge end, a transfer unit for transferring articles from said supply conveyor to said receiving conveyors, said transfer unit comprising a trackway aligned with said supply conveyor at said discharge end, a carriage, means mounting said carriage on said trackway for movement between a position overlying an end portion of said supply conveyor and a position overlying said receiving conveyors, a pair of depending supports secured to said carriage, said supports being disposed in transversely and longitudinally staggered relation whereby one of the supports will overlie one half of the articles in one row of articles on said supply conveyor and the other of said supports will overlie one half of the articles in a next following row of articles at the other side of said conveyor, a plurality of pick-up heads carried by said supports for engaging a like number of articles, means for engaging said pick-up heads with articles on said supply conveyor, and means for rendering said pick-up heads inoperative to release articles when said supports are each aligned with one of said receiving conveyors.

2. The combination of claim 1; wherein said pick-up heads are of the suction type and particularly adapted for use in transferring open mouth hollow articles, each of said pick-up heads including a face plate for engaging in sealed relation mouths of hollow articles whereby said pick-up heads also function to inspect hollow articles by failing to pick up hollow articles having imperfect mouths.

3. The combination of claim 2; wherein a cullet receptacle is disposed at the end of said supply conveyor intermediate said supply conveyor and said receiving conveyors for receiving from said supply conveyor culls remaining on said supply conveyor.

4. A conveyor system for individual articles such as glass jars and the like, said conveyor system comprising a supply conveyor having disposed thereon in processional order transversely extending rows of articles, said supply conveyor having a discharge end, a pair of receiving conveyors, said receiving conveyors being disposed in side-by-side relation at the discharge end of said supply conveyor and extending generally normal to the axis of said supply conveyor, and transfer means mounted adjacent said supply conveyor and said receiving conveyors for simultaneously transferring articles from one row of articles on said supply conveyor to one of said receiving conveyors and articles from a following row of articles on said supply conveyor to the other of said receiving conveyors.

5. The conveyor system of claim 4 wherein said transfer means includes an overhead carriage drive means connected to said carriage for moving said carriage from a position overlying an end portion of said supply conveyor to a position overlying both of said receiving conveyors, and a pair of article supports depending from said carriage, said article supports being spaced longitudinally of said supply conveyor.

6. The conveyor system of claim 5 wherein said article supports are offset from each other transversely of said supply conveyor whereby each of said article supports receives only a portion of the articles of each row of articles.

7. The conveyor system of claim 5 wherein each of said article supports includes a plurality of pick-up heads for engaging individual articles, said pick-up heads being of the suction type and being particularly adapted to open mouth hollow articles, each pick-up head including means for engaging and forming a seal with an open mouth of a hollow article whereby in the act of transferring articles imperfections in mouths of the articles being transferred may be ascertained by the refusal of said pick-up heads to form a seal with and pick up the articles.

8. A transfer mechanism for transferring articles from a supply conveyor to a receiving conveyor, said transfer mechanism comprising a trackway, a carriage, means on said carriage supporting said carriage relative to said trackway and for movement along said trackway between a position overlying the supply conveyor and a position overlying the receiving conveyor, drive means connected to said carriage for effecting a cycle movement of said carriage from a position overlying the supply conveyor to a position overlying the receiving conveyor and back to the original position of said carriage overlying said supply conveyor, at least one pick-up head, means mounting said pick-up head on said carriage in depending relation and for vertical movement, pick-up head lowering means carried by said carriage and responsive to the driving of said carriage to momentarily lower said pick-up head into engagement with an article to be transferred, and release means carried by said carriage and responsive to the driving of said carriage to render said pick-up head inoperative to thereby release the article being transferred when said pick-up head is overlying the receiving conveyor, said drive means including a drive shaft, means mounting said drive shaft on said carriage for rotation, a crank arm on said drive shaft for rotation with said drive shaft, and a link, one end of said link being pivotally connected to said crank arm and the other end of said link being pivotally connected to a member fixedly positioned relative to said trackway whereby as said drive shaft is rotated, said carriage is reciprocated along said trackway with the rate of movement of said carriage being described by a harmonic motion curve.

9. The transfer mechanism of claim 8; wherein said pick-up head lowering means and said release means each includes an actuating cam secured to said drive shaft for rotation with said drive shaft.

10. A transfer mechanism for transferring articles from a supply conveyor to a receiving conveyor, said transfer mechanism comprising a trackway, a carriage, means on said carriage supporting said carriage relative to said trackway and for movement along said trackway between a position overlying the supply conveyor and a position overlying the receiving conveyor, drive means connected to said carriage for effecting a cycle movement of said carriage from a position overlying the supply conveyor to a position overlying the receiving conveyor and back to the original position of said carriage overlying said supply conveyor, at least one pick-up head, means mounting said pick-up head on said carriage in depending relation and for vertical movement, pick-up head lowering means carried by said carriage and responsive to the driving of said carriage to momentarily lower said pick-up head into engagement with an article to be transferred, and release means carried by said carriage and responsive to the driving of said carriage to render said pick-up head inoperative to thereby release the article being transferred when said pick-up head is overlying the receiving conveyor, said drive means including control means for effecting the driving of said carriage through a single cycle and stopping said carriage at the end of said cycle in the same relationship to the supply conveyor, and means connected to said control means for initiating the operation of said control means in response to movement of an article to a predetermined position on the supply conveyor.

11. A transfer and inspection mechanism for transferring open mouth hollow articles such as glass jars from a supply conveyor to a receiving conveyor and simultaneously inspecting the articles for defects particularly in the area of the mouths of the articles, said transfer and inspection mechanism comprising a trackway extending from a position coextensive with a portion of the supply conveyor to a position coextensive with a portion of the receiving conveyor, a carriage, means mounting said carriage for movement along said trackway between a position overlying the supply conveyor to a position overlying the receiving conveyor, drive means connected to said carriage for effecting a cycle movement of said carriage from a position overlying the supply conveyor to a position overlying the receiving conveyor and back to the original position of said carriage overlying the supply conveyor, at least one pick-up head, means mounting said pick-up head on said carriage in depending relation and for vertical movement, said pick-up head being of the suction type and having a suction line connected thereto, said pick-up head having means for engaging and forming a seal with an open mouth of a hollow article whereby in the act of transferring an article imperfections in the mouths of the articles may be ascertained by the refusal of the pick-up head to form a seal with and pick up the articles, pick-up head lowering means carried by said carriage and responsive to the driving of said carriage to momentarily lower said pick-up head into engagement with the article to be transferred, and release means carried by said carriage and responsive to the driving of said carriage to render said pick-up head inoperative and thus release the article being transferred when said pick-up head is overlying the receiving carriage, said drive means including a drive shaft, means mounting said drive shaft on said carriage for rotation, a crank arm on said drive shaft for rotation with said drive shaft, and a link, one end of said link being pivotally connected to said crank arm and the other end of said link being pivotally connected to a member fixedly positioned relative to said trackway whereby as said drive shaft is rotated, said carriage is reciprocated along said trackway with the rate of movement of said carriage being described by a harmonic motion curve.

12. The transfer mechanism of claim 11; wherein said pick up head lowering means and said release means each includes an actuating cam secured to said drive shaft for rotation with said drive shaft.

13. The transfer mechanism of claim 12; wherein said release means includes a valve disposed in said suction line and said valve is actuated through one of said drive shaft cams.

14. A cullet disposal unit for receiving culls and broken pieces of articles from an end of a supply conveyor, said cullet disposal unit comprising a cullet conveyor disposed adjacent the end of and below the supply conveyor, a primary chute sloping downwardly from an upper part of the end of the supply conveyor to said cullet conveyor for directing culls and large broken pieces from the supply conveyor to said cullet conveyor, and a secondary chute underlying said primary chute, said secondary chute sloping downwardly from a position underlying a lower part of the supply conveyor inwardly of the extreme end thereof and below the vertical center thereof to said cullet conveyor and receiving small broken pieces dropping by gravity from the supply conveyor, said cullet conveyor being encased in a housing with the pressure of air within said housing being less than the pressure of surrounding air whereby escape of fine particles of rejected articles from said cullet conveyor is prevented.

15. A combined conveying, transferring and inspecting system for open mouth hollow articles such as glass jars, said system comprising a supply conveyor having a discharge end, a receiving conveyor disposed adjacent said supply conveyor discharge end and extending generally normal to said supply conveyor, a cullet disposal unit disposed at said supply conveyor discharge end adjacent said supply conveyor and said receiving conveyor, and a transfer and inspection unit, said transfer and inspection unit including a trackway aligned with said supply conveyor at said discharge end, a carriage, means mounting said carriage on said trackway for movement along said trackway between a position overlying an end portion of said supply conveyor and a position overlying said receiving conveyor, drive means connected to said carriage for moving said carriage along said trackway, a plurality of pick-up heads depending from said carriage for engaging a like number of hollow ware articles and temporarily supporting acceptable ones of the hollow ware articles in suspended relation below said carriage for transfer from said supply conveyor to said delivery conveyor, and leaving culls on said supply conveyor, pick-up heads normally being disposed above the plane of the hollow ware articles, means carried by said carriage for lowering said pick-up heads into engagement with hollow ware articles on said delivery conveyor, and other means carried by said carriage for deactivating said pick-up heads when in overlying relation to said receiving conveyor to thereby release and set transferred hollow ware articles on said receiving conveyor, said cullet disposal unit including a cullet conveyor disposed adjacent the discharge end of said supply conveyor for receiving culls and broken pieces from said supply conveyor, a primary chute in longitudinal alignment with said conveyor and sloping downwardly from an upper part of the discharge end of said supply conveyor to said cullet conveyor for directing culls and large broken pieces from said supply conveyor to said cullet conveyor, and a secondary chute underlying said primary chute in spaced relation thereto, said secondary chute sloping downwardly from a position underlying a lower part of the discharge end of said supply conveyor to said cullet conveyor and receiving small broken pieces dropping by gravity from the supply conveyor onto said secondary chute.

16. The system of claim 15; wherein said cullet conveyor is encased in a housing with the pressure of air within said housing being less than the pressure of air surrounding the housing whereby escape of fine particles of rejected articles from the cullet conveyor is prevented.

17. A conveyor system for individual articles such as glass jars and the like, said conveyor system comprising a supply conveyor having disposed thereon in processional order transversely extending rows of articles, said supply conveyor having a discharge end, a pair of receiving conveyors, said receiving conveyors being disposed in side-by-side relation at the discharge end of said supply conveyor and extending generally normal to the axis of said supply conveyor, transfer means mounted adjacent said supply conveyor and said receiving conveyors for simultaneously transferring articles from one row of articles on said supply conveyor to one of said receiving conveyors and articles from a following row of articles on said supply conveyor to the other of said receiving conveyors, and a cullet discharge disposed at the discharge end of said supply conveyor and adjacent said receiving conveyors, said transfer means including an overhead carriage, drive means connected to said carriage for moving said carriage from a position overlying an end portion of said supply conveyor to a position overlying both of said receiving conveyors, a pair of article supports depending from said carriage, said article supports being spaced longitudinally of said supply conveyors and offset from each other transversely of said supply conveyor whereby each of said article supports receives only a portion of the articles of each row of articles, each of said article supports including a plurality of pick-up heads for engaging individual articles, each of said pick-up heads being of the suction type and being particularly adapted to open mouth hollow articles such as glass jars, each pick-up head including means for engaging and forming a seal with an open mouth of a hollow article whereby in the act of transferring articles imperfections in the mouths of the articles will result in the failure of said pickup heads to form a seal with the articles and to thus pick up only acceptable articles and to leave culls, means carried by said carriage for rendering said pickup heads inoperative when overlying said receiving conveyors to thereby release the articles, and pusher bar means disposed rearwardly of the rearmost one of said article supports for engaging culls left by said rearmost article support only and pushing such culls off said supply conveyor into said cullet discharge.

18. The transfer mechanism of claim 17; wherein said drive means includes a drive shaft, means mounting said drive shaft on said carriage for rotation, a crank arm on said drive shaft for rotation with said drive shaft, and a link, one end of said link being pivotally connected to said crank arm and the other end of said link being pivotally connected to a member fixedly positioned relative to said trackway whereby as said drive shaft is rotated, said carriage is reciprocated along said trackway with the rate of movement of said carriage being described by a harmonic motion curve.

19. A conveyor system for individual articles such as glass jars and the like, said conveyor system comprising a supply conveyor having disposed thereon in processional order transversely extending rows of articles, said supply conveyor having a discharge end, a pair of receiving conveyors, said receiving conveyors being disposed in side-by-side relation at the discharge end of said supply conveyor and extending generally normal to the axis of said supply conveyors, transfer means mounted adjacent said supply conveyor and said receiving conveyors for simultaneously transferring articles from one row of articles on said supply conveyor to one of said receiving conveyors and articles from a following row of articles on said supply conveyor to the other of said receiving conveyors, and a cullet discharge disposed at the discharge end of said supply conveyor and adjacent said receiving conveyors, said transfer means including an overhead carriage and a trackway supporting said carriage, drive means connected to said carriage for moving said carriage from a position overlying an end portion of said supply conveyor to a position overlying both of said receiving conveyors, a pair of article supports depending from said carriage, said article supports being spaced longitudinally of said supply conveyor and offset from each other transversely of said supply conveyor whereby each of said article supports receives only a portion of the articles of each row of articles, each of said article supports including a plurality of pick-up heads for engaging individual articles, each of said pick-up heads being of the suction type and being particularly adapted to open mouth hollow articles such as glass jars, each pick-up head including means for engaging and forming a seal with an open mouth of a hollow article whereby in the act of transferring articles imperfections in the mouths of the articles will result in the failure of said pick-up heads to form a seal with and to pick up the articles, means carried by said carriage for rendering said pick-up heads inoperative when overlying said receiving conveyors to thereby release the articles, said drive means including a drive shaft, means mounting said drive shaft on said carriage for rotation, a crank arm on said drive shaft for rotation with said drive shaft, and a link, one end of said link being pivotally connected to said crank arm and the other end of said link being pivotally connected to a member fixedly positioned relative to said trackway whereby as said drive shaft is rotated, said carriage is reciprocated along said trackway with the rate of movement of said carriage being described by a harmonic motion curve.

20. The conveyor system of claim 19; wherein said pick-up head lowering means and said release means each includes an actuating cam secured to said drive shaft for rotation with said drive shaft.

21. The conveyor system of claim 20; wherein each of said cams is formed in sections and adjustably mounted on said drive shaft whereby the relative positions of said cams with respect to each other and to said drive shaft may be varied in accordance with operating requirements.

22. The conveyor system of claim 20; wherein said drive means includes control means for effecting the driving of said carriage through a single cycle and stopping said carriage at the end of said cycle in the same relationship to said supply conveyor, and actuating means connected to said control means for initiating the operation of said control means in response to the movement of an article to a predetermined position on said supply conveyor.

23. The conveyor system of claim 22; wherein said actuating means is in the form of a photo-electric cell unit including a light source and a photo-electric cell mounted on opposite sides of said supply conveyor in transverse alignment.

24. The conveyor system of claim 19; wherein said article supports include means for lowering said pick-up heads to engage articles, said pick-up head lowering means and said release means each includes a cam assembly secured to said drive shaft for rotation with said drive shaft, each cam assembly including a hub secured to said drive shaft, a sectional cam rotatably mounted on said hub, and clamp means retaining said cam in an adjusted position on said hub.

25. The conveyor system of claim 24; wherein said clamp means includes a shoulder on said hub against which said cam abuts, a beveled surface on said cam remote from said shoulder, and fasteners carried by said hub, said fasteners having tapered heads corresponding to and tightly engaging said beveled surface to clamp said cam against said shoulder.

26. A cam assembly for a rotating shaft, said cam assembly comprising hub having shaft attaching means, a sectional cam rotatably mounted on said hub, and clamp means retaining said cam in an adjusted position on said hub, said clamp means including a shoulder on said hub against which said cam abuts, a beveled surface on said cam remote from said shoulder, and fasteners carried by said hub alongside said beveled surface, said fasteners have tapered heads corresponding and tightly engaging said beveled surface to clamp said cam against said shoulder.

27. A conveyor system for individual articles such as glass jars and the like, said conveyor system comprising a supply conveyor having disposed thereon in processional order transversely extending rows of articles, said supply conveyor having a discharge end, a pair of receiving conveyors, said receiving conveyors being disposed in side-by-side relation at the discharge end of said supply conveyor and extending generally normal to the axis of said supply conveyor, and transfer means mounted adjacent said supply conveyor and said receiving conveyors for simultaneously picking up and transferring certain of the articles on said supply conveyor to one of said receiving conveyors and others of the articles on said supply conveyor to the other of said receiving conveyors.

28. A transfer and inspection mechanism for transferring articles such as glass jars from a supply conveyor to a receiving conveyor and simultaneously inspecting the articles for defects, said transfer and inspection mechanism including at least one pick-up head for engaging and inspecting articles on said supply conveyor and lifting articles passing the inspection from said supply conveyor and holding such articles, carriage means connected to said pick-up head and supporting said pick-up head for movement back and forth between a position overlying said supply conveyor and a position overlying said receiving conveyor, and a pusher bar carried by said carriage means for engaging rejected articles on said supply conveyor and moving such rejected articles off of said supply conveyor during an article transferring operation, said carriage means including means for raising and lowering said pusher bar in timed sequence to the movement of said carriage with said pusher bar clearing articles to be transferred during the return stroke of said pusher bar.

29. A combination carriage and drive assembly comprising a carriage, a drive shaft, means mounting said drive shaft on said carriage for rotation, a crank arm on said drive shaft for rotation with said drive shaft, and a link, one end of said link being pivotally connected to said crank arm and the other end of said link being pivotally connected to a member fixedly positioned relative to said trackway whereby as said drive shaft is rotated, said carriage is reciprocated along said trackway with the rate of movement of said carriage being described by a harmonic motion curve.

30. The combination of claim 29 with the addition of drive means for rotating said drive shaft, said drive means including control means for the cycle driving of said drive shaft and the stopping of said drive shaft at the end of each rotation at a point adjacent a dead center position of said crank arm and said link.

31. The combination of claim 29 with the addition of drive means for rotating said drive shaft, said drive means including control means for the cycle driving of said drive shaft and the stopping of said drive shaft at the end of each rotation at a point adjacent a dead center position of said crank arm and said link, said control means including a constantly running drive unit and simultaneously operated brake and clutch means between said drive unit and said drive shaft.

References Cited in the file of this patent

UNITED STATES PATENTS

| | | |
|---|---|---|
| 1,275,099 | Steele | Aug. 6, 1918 |
| 1,495,945 | Wyatt | May 27, 1924 |
| 1,630,366 | Wildhaber | May 21, 1927 |
| 1,770,916 | Griffin et al. | July 22, 1930 |
| 1,886,295 | Morris | Nov. 1, 1932 |
| 1,998,163 | Meyer | Apr. 16, 1935 |
| 2,135,986 | Morton | Nov. 8, 1938 |
| 2,352,091 | Fedorchak | June 20, 1944 |
| 2,407,062 | Darrah | Sept. 3, 1946 |
| 2,485,040 | Cupo | Oct. 18, 1949 |
| 2,561,529 | Mongan et al. | July 24, 1951 |
| 2,665,013 | Socke | Jan. 5, 1954 |
| 2,676,740 | Birkland | Apr. 27, 1954 |
| 2,677,471 | Skinner | May 4, 1954 |

FOREIGN PATENTS

| | | |
|---|---|---|
| 1,148,904 | France | July 1, 1957 |